United States Patent
Xia et al.

(10) Patent No.: US 11,120,023 B2
(45) Date of Patent: Sep. 14, 2021

(54) SYSTEM FOR HANDLING CONCURRENT PROPERTY GRAPH QUERIES

(71) Applicant: Huawei Technologies Co., Ltd., Shenzhen (CN)

(72) Inventors: Yinglong Xia, San Jose, CA (US); Li Zhou, Columbus, OH (US); Ren Chen, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/929,739

(22) Filed: May 19, 2020

(65) Prior Publication Data

US 2021/0004374 A1 Jan. 7, 2021

Related U.S. Application Data

(63) Continuation of application No. PCT/US2019/035805, filed on Jun. 6, 2019.
(Continued)

(51) Int. Cl.
  *G06F 16/2455* (2019.01)
  *G06F 16/2453* (2019.01)
  (Continued)

(52) U.S. Cl.
  CPC ...... *G06F 16/24549* (2019.01); *G06F 9/4881* (2013.01); *G06F 9/52* (2013.01);
  (Continued)

(58) Field of Classification Search
  CPC .......... G06F 16/24549; G06F 16/2455; G06F 16/2315; G06F 16/9024; G06F 9/4881; G06F 9/52
  (Continued)

(56) References Cited

U.S. PATENT DOCUMENTS

| 10,394,891 B2 * | 8/2019 | Chen | G06F 16/9024 |
| 10,552,450 B2 * | 2/2020 | Chen | G06F 16/9024 |

(Continued)

FOREIGN PATENT DOCUMENTS

WO  WO-2019241021 A1  12/2019

OTHER PUBLICATIONS

"International Application Serial No. PCT/US2019/035805, International Preliminary Report on Patentability dated Dec. 24, 2020", 10 pgs.

(Continued)

*Primary Examiner* — Hanh B Thai
(74) *Attorney, Agent, or Firm* — Schwegman Lundberg & Woessner, P.A.

(57) ABSTRACT

A graph processing system for concurrent property graph queries of a property graph implemented in a distributed network computes on respective nodes a subgraph shard represented as edge-sets containing vertices within a certain range. Each node stores data for a subgraph shard that contains a range of local vertices that are a subset of all vertices of the property graph. Each subgraph shard also has boundary vertices having edges that connect the subgraph shard to boundary vertices of another subgraph shard. Upon receipt of concurrent queries of the property graph, a query of the subgraph shards is scheduled in accordance with an initial vertex for each concurrent user query. The property graph is traversed by traversing edge-sets within a subgraph shard on each node and during traversal messaging is used to send values of boundary vertices to at least one other node having another subgraph shard sharing the boundary vertices.

20 Claims, 20 Drawing Sheets

Related U.S. Application Data

(60) Provisional application No. 62/685,555, filed on Jun. 15, 2018.

(51) Int. Cl.
*G06F 16/23* (2019.01)
*G06F 16/901* (2019.01)
*G06F 9/48* (2006.01)
*G06F 9/52* (2006.01)

(52) U.S. Cl.
CPC ...... *G06F 16/2315* (2019.01); *G06F 16/2455* (2019.01); *G06F 16/9024* (2019.01)

(58) Field of Classification Search
USPC ......................................................... 707/718
See application file for complete search history.

(56) References Cited

U.S. PATENT DOCUMENTS

| | | | | |
|---|---|---|---|---|
| 2002/0048272 | A1* | 4/2002 | Carvey | H04L 49/251 370/400 |
| 2002/0049901 | A1* | 4/2002 | Carvey | H04L 49/251 713/153 |
| 2006/0142995 | A1* | 6/2006 | Knight | G06F 40/44 704/9 |
| 2009/0217248 | A1* | 8/2009 | Bently | G06F 8/30 717/132 |
| 2015/0170316 | A1 | 6/2015 | Balmin et al. | |
| 2015/0350324 | A1* | 12/2015 | Hu | H04L 67/1031 709/219 |
| 2016/0342708 | A1* | 11/2016 | Fokoue-Nkoutche | G06F 16/2255 |
| 2016/0342709 | A1* | 11/2016 | Fokoue-Nkoutche | G06F 16/9024 |
| 2018/0039673 | A1* | 2/2018 | Chen | G06F 16/9024 |
| 2018/0039709 | A1* | 2/2018 | Chen | G06F 16/9024 |
| 2018/0039710 | A1* | 2/2018 | Chen | G06F 16/9024 |
| 2018/0089002 | A1 | 3/2018 | Xia et al. | |
| 2018/0268079 | A1* | 9/2018 | Das | G06F 16/9024 |
| 2018/0322179 | A1* | 11/2018 | Kalinin | G06F 16/258 |
| 2019/0347125 | A1* | 11/2019 | Sankaran | G06F 9/3001 |
| 2020/0201910 | A1* | 6/2020 | Gavaudan | G06Q 20/3823 |

OTHER PUBLICATIONS

"International Application Serial No. PCT/US2019/035805, International Search Report dated Aug. 28, 2019", 5 pgs.

"International Application Serial No. PCT/US2019/035805, Written Opinion dated Aug. 28, 2019", 7 pgs.

Vasiliki, Kalavri, et al., "High-Level Programming Abstractions for Distributed Graph Processing", Arxiv.Org, Cornell University Library, 201 Olin Library Cornell University Ithaca, Ny 1485, (Jul. 9, 2016), 19 pgs.

Xia, Yinglong, et al., "Towards Balance-Affinity Tradeoff in Concurrent Subgraph Traversals", 2014 IEEE 28th International Parallel and Distributed Processing Symposium, (May 25, 2015), 10 pgs.

Zhou, Li, et al., "C-Graph: A Highly Efficient Concurrent Graph Reachability Query Framework", ICPP 2018, Aug. 13-16, 2018, Eugene, or, USA; Copyright 2018 Association for Computing Machinery, (Aug. 13, 2018), 10 pgs.

* cited by examiner

TWO CONCURRENT GRAPH TRAVERSAL QUERIES

AN EXAMPLE GRAPH

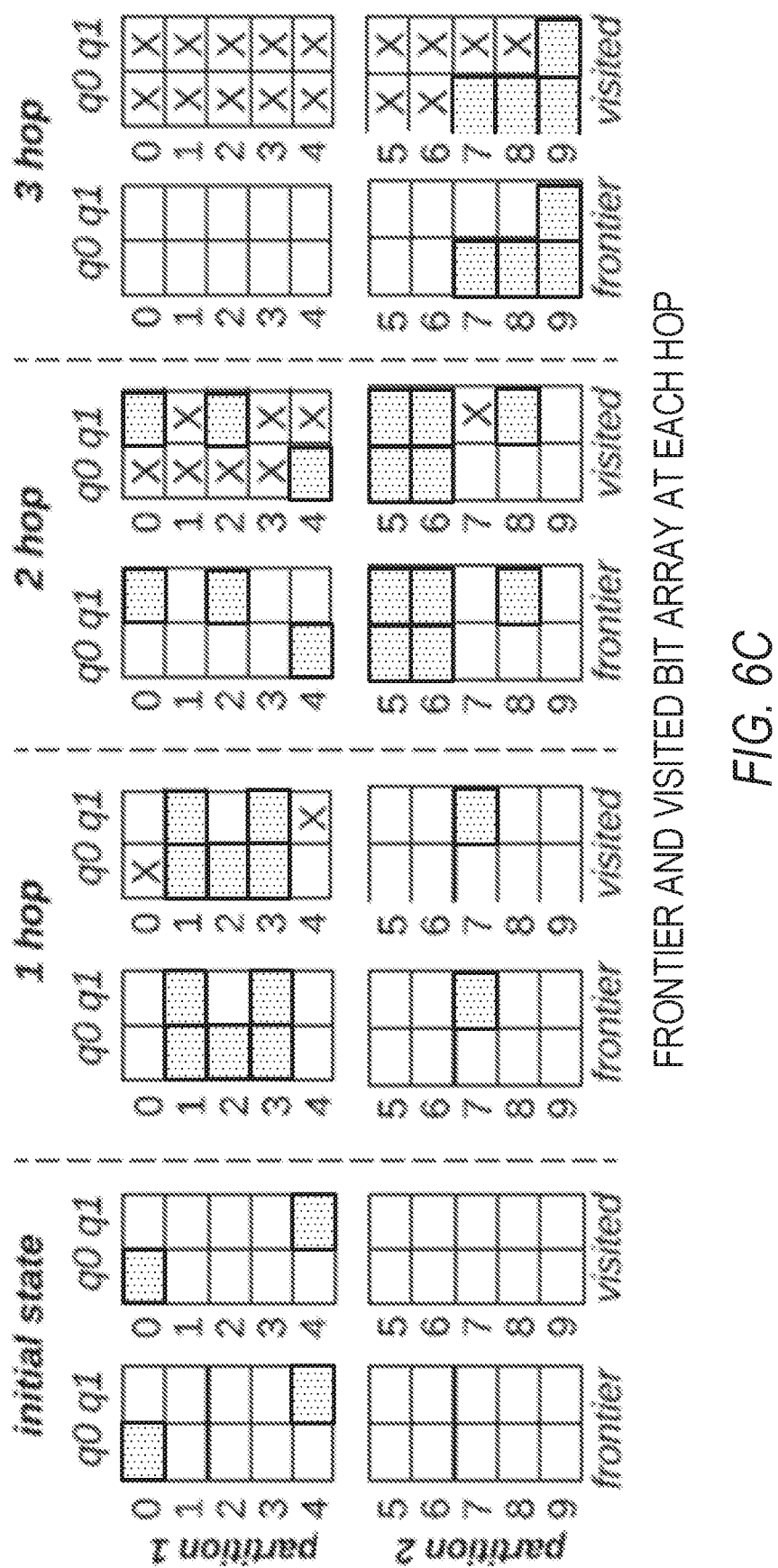
FIG. 6C  FRONTIER AND VISITED BIT ARRAY AT EACH HOP

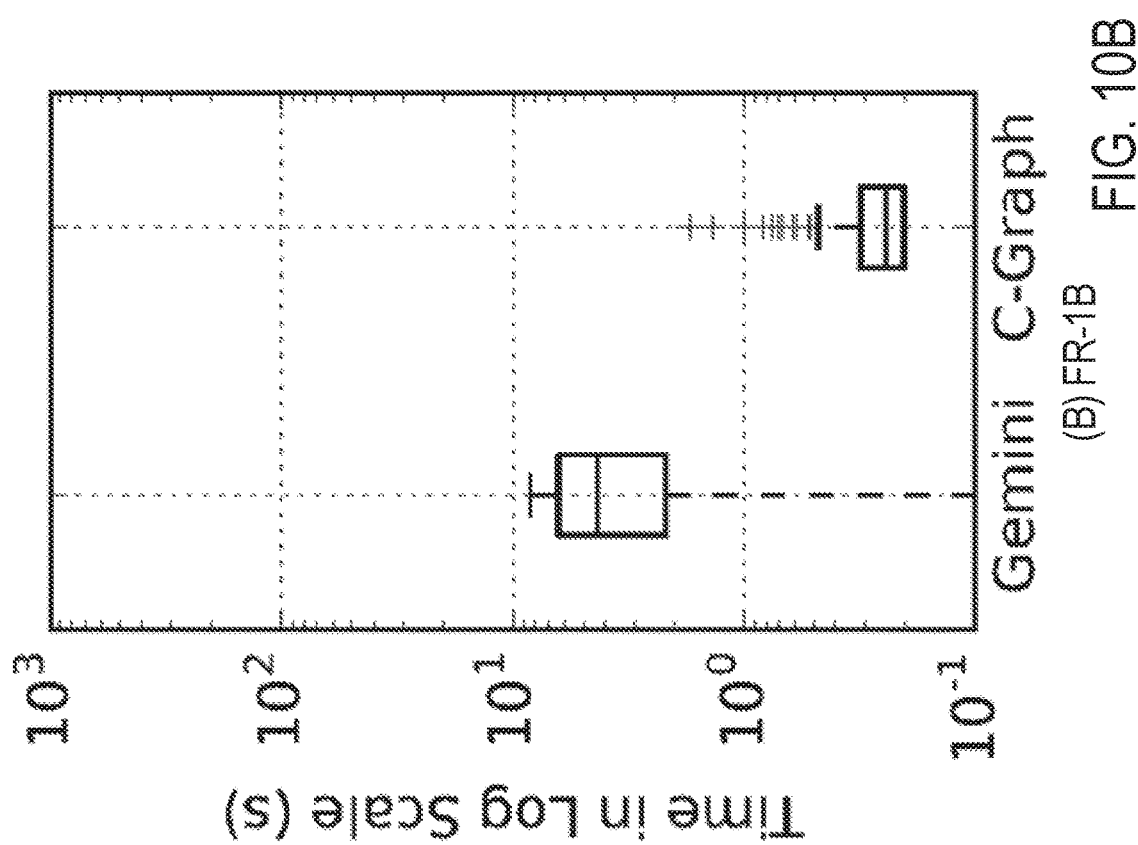
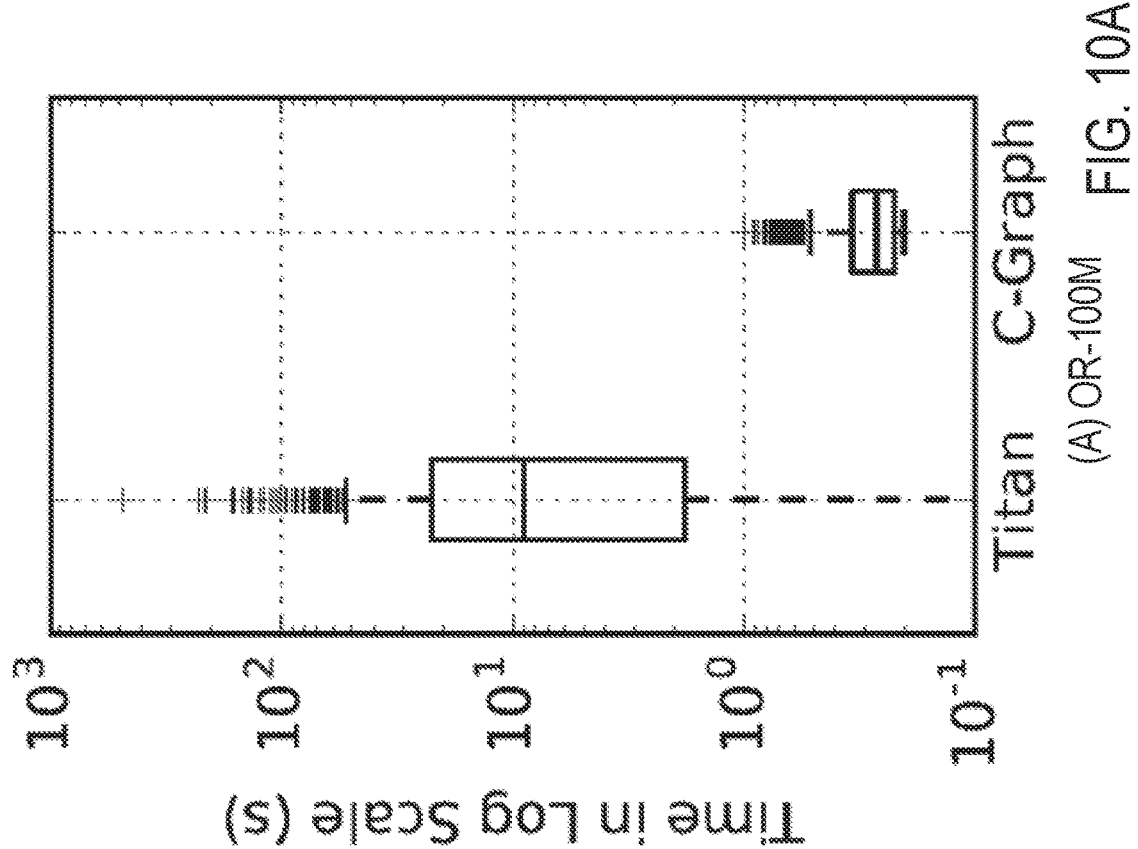
FIG. 10A
FIG. 10B

SYSTEM FOR HANDLING CONCURRENT PROPERTY GRAPH QUERIES

CROSS-REFERENCE TO RELATED APPLICATION

This application is a continuation application of and claims priority to International Application No. PCT/US2019/035805, filed 6 Jun. 2019, entitled "System for Handling Concurrent Property Graph Queries," which claims priority to U.S. Provisional Application Ser. No. 62/685,555, filed 15 Jun. 2018, entitled "Methodology and System for Handling Concurrent Property Graph Queries," the contents of each of which are hereby incorporated by reference in their entirety.

TECHNICAL FIELD

The present disclosure is related to an edge-set based property graph traversal framework that runs on a distributed infrastructure.

BACKGROUND

Many big data analytics applications explore a set of related entities, which are naturally modeled as graph. However, graph processing is notorious for its performance challenges due to random data access patterns, especially for large data volumes in industrial-scale applications. Solving these challenges is critical to the performance of such industry-scale applications.

Graph processing has been widely adopted in big data analytics and plays an increasingly important role in knowledge graph and machine learning applications. Many real-world scenarios such as social networks, web graphs, wireless network, etc., are naturally represented as large scale graphs. Modeling applications as graphs provides an intuitive representation that allows exploration and extraction of valuable information from data. For example, in recommendation systems, information about neighbors is analyzed to predict the user's interests and to improve click-through rate. High performance graph processing also benefits a wealth of important algorithms. For instance, mapping applications make extensive use of shortest path graph traversal algorithms for navigation. To effectively manage and process graphs, graph databases such as JanusGraph®, Neo4j®, and others have been developed. Graph processing frameworks are also commonly found as critical components in many big data computing platforms, such as Giraph™ in Hadoop®, GraphX® in Spark™, Gelly™ in Flink®, etc. However, such graph processing systems typically focus on accelerating a single graph processing task and do not consider multiple graph processing tasks running concurrently, such as a group of queries issued simultaneously to the same graph, as required for industrial-scale applications in real-world scenarios.

SUMMARY

Various examples are now described to introduce a selection of concepts in a simplified form that are further described below in the Detailed Description. This Summary is not intended to identify key or essential features of the claimed subject matter, nor is it intended to be used to limit the scope of the claimed subject matter.

A graph processing system is desired that can support concurrent property graph queries to improve average response times for k-hop reachability queries in distributed environments. Typically, a property graph includes directional axes and attributes (properties) of a user (e.g., the user's name), data relationships, and the like. The system and method described herein is related to an edge-set based graph traversal framework called C-Graph (i.e., Concurrent Graph) that runs on a distributed infrastructure and achieves both high concurrency and efficiency for k-hop reachability queries. The systems and methods described herein may be implemented via graph processing software that is executed by one or more processors in a distributed processing system that supports concurrent queries of the property graph.

In sample embodiments, the system described herein is designed to meet the industrial requirements of efficiently handling a group of simultaneous graph queries on large graphs, rather than accelerating a single graph processing task exclusively on a server/cluster as in conventional systems. Such concurrency is needed as it is very common to have many users concurrently access a graph, using different queries, especially for cloud services. Also, in many scenarios, the graph size becomes increasingly large, resulting in significant overhead in duplicating a graph instance. In addition, generating too many instances results in challenges in efficient data consistency across the instances. As a result, it is important to support concurrent queries within each instance to avoid too much data duplication. Also, updates should be across instances with increased concurrency within each instance. To achieve these goals, the C-Graph traversal framework described herein maintains global vertex states to facilitate graph traversals and supports both synchronous and asynchronous communication interfaces. For any graph processing tasks that can be decomposed into a set of local traversals, such as the graph k-hop reachability query, such an approach exhibits excellent performance relative to conventional systems.

A first aspect of the present disclosure relates to a graph processing system that provides for concurrent property graph queries of a property graph where the property graph is implemented in a distributed network of nodes. The graph processing system includes at least one processor and a machine-readable medium comprising instructions thereon that, when executed by the at least one processor, causes the at least one processor to perform operations including determining on a node of a plurality of nodes within the distributed network of nodes a subgraph shard of a plurality of subgraph shards of the property graph, the node storing data for the subgraph shard that contains a range of local vertices that are a subset of all vertices of the property graph, the subgraph shard having boundary vertices that have edges that connect the subgraph shard to boundary vertices of another subgraph shard. The operations further include converting the subgraph shard into a set of edge-sets containing vertices within a certain range by vertex identifier, receiving concurrent queries of the property graph from at least one user, scheduling a query of the subgraph shard of the plurality of subgraph shards in accordance with an initial vertex for each concurrent user query, and traversing the property graph during execution of the concurrent queries by traversing edge-sets within the subgraph shard. In the sample embodiments, the node sends values of boundary vertices of the subgraph shard to at least one other node having another subgraph shard s sharing the boundary vertices using messaging during traversal of the property graph.

In a first implementation according to the first aspect as such, each subgraph shard on each node comprises two bit arrays: a first array for marking a list of adjacent vertices to visit in a next iteration of traversal of the subgraph shard and a second array for verifying vertices in the subgraph shard that already have been visited. The first array and second array have a size N by k, where N is a number of vertices in the subgraph shard and k is a number of concurrent user queries.

In a second implementation according to the first aspect or any preceding implementation of the first aspect, traversing the property graph further comprises finding unvisited neighbor nodes in the edge-sets and populating the unvisited neighbor nodes into the first array, visiting the unvisited neighbor nodes and checking for unvisited neighbor nodes, and repeating the visiting and checking for different nodes including at least one of the plurality of subgraph shards.

In a third implementation according to the first aspect or any preceding implementation of the first aspect, the node provides to the subgraph shard on the node an inbox for receiving messages from a neighbor subgraph shard and an outbox for providing messages to the neighbor subgraph shard when the neighbor subgraph shard is located on another node in the distributed network of nodes.

In a fourth implementation according to the first aspect or any preceding implementation of the first aspect, the machine-readable medium further comprises instructions that, when executed by the at least one processor, causes the at least one processor to traverse the property graph during execution of the concurrent queries by starting from each root and propagating a unique label to each neighbor vertex to mark traversed edges in an edge-set of the subgraph shard and by using the inbox and outbox to buffer the unique labels sent to and received from the neighbor subgraph shard on the another node in the distributed network of nodes.

In a fifth implementation according to the first aspect or any preceding implementation of the first aspect, the machine-readable medium further comprises instructions that, when executed by the at least one processor, causes the at least one processor to optimize respective edge-sets for sparsity and cache locality.

In a sixth implementation according to the first aspect or any preceding implementation of the first aspect, traversing the property graph comprises traversing (1) shared neighbor vertices of adjacent vertices to visit in a next iteration of traversal of the subgraph shard within an edge-set and (2) shared vertices among concurrent queries only one time for the concurrent queries.

In a seventh implementation according to the first aspect or any preceding implementation of the first aspect, traversing the property graph comprises eliminating repeated traversals of the property graph for a set of queries according to the shared neighbor vertices of adjacent vertices and shared vertices among concurrent queries within the edge-set, wherein the edge-set is accessed once and data therefrom is cached for re-use.

In an eighth implementation according to the first aspect or any preceding implementation of the first aspect, the machine-readable medium further comprises instructions that, when executed by the at least one processor, causes the at least one processor to utilize dynamic resource allocation during traversals of the property graph and to store values for a previous and a current level of the property graph.

In a ninth implementation according to the first aspect or any preceding implementation of the first aspect, the machine-readable medium further comprises instructions that, when executed by the at least one processor, causes the at least one processor to assign vertices of the property graph to different subgraph shards based on vertex identifier and to assign all out-going edges of a vertex to a same subgraph shard.

A second aspect of the present disclosure relates to a method for concurrently querying a property graph implemented in a distributed network of nodes. The method includes determining on a node of a plurality of nodes within the distributed network of nodes a subgraph shard of a plurality of subgraph shards of the property graph. The node stores data for the subgraph shard that contains a range of local vertices that are a subset of all vertices of the property graph. The subgraph shard has boundary vertices that have edges that connect the subgraph shard to boundary vertices of another subgraph shard, and the subgraph shard comprises a set of edge-sets containing vertices within a certain range by vertex identifier. The method further includes receiving concurrent queries of the property graph from at least one user, scheduling a query of the subgraph shard of the plurality of subgraph shards in accordance with an initial vertex for each concurrent user query, traversing the property graph during execution of the concurrent queries by traversing edge-sets within the subgraph shard, and the node sending values of boundary vertices of the subgraph shard to at least one other node having another subgraph shard sharing the boundary vertices using messaging during traversal of the property graph.

In a first implementation according to the second aspect as such, traversing the property graph further comprises finding unvisited neighbor nodes in the edge-sets and populating the unvisited neighbor nodes into a first array for marking a list of adjacent vertices to visit in a next iteration of traversal of the subgraph shard, visiting the unvisited neighbor nodes and checking for unvisited neighbor nodes, and repeating the visiting and checking for different nodes including at least one of the plurality of subgraph shards.

In a second implementation according to the second aspect or any preceding implementation of the second aspect, traversing the property graph further comprises keeping a record of vertices in the subgraph shard that already have been visited in a second array, the first array and second array having a size N by k, where N is a number of vertices in the subgraph shard and k is a number of concurrent user queries.

In a third implementation according to the second aspect or any preceding implementation of the second aspect, traversing the property graph further comprises providing messages to an outbox destined for a neighbor node on a neighbor subgraph shard when the neighbor subgraph shard is located on another node in the distributed network of nodes.

In a fourth implementation according to the second aspect or any preceding implementation of the second aspect, traversing the property graph further comprises starting from each root specified by the query and propagating a unique label to each neighbor vertex to mark traversed edges in an edge-set of the subgraph shard and buffering the unique labels to send to and receive from the neighbor subgraph shard on the another node in the distributed network of nodes.

In a fifth implementation according to the second aspect or any preceding implementation of the second aspect, the method further comprises optimizing respective edge-sets for sparsity and cache locality.

In a sixth implementation according to the second aspect or any preceding implementation of the second aspect, traversing the property graph further comprises traversing (1) shared neighbor vertices of adjacent vertices to visit in a next iteration of traversal of the subgraph shard within an edge-set and (2) shared vertices among concurrent queries only one time for the concurrent queries.

In a seventh implementation according to the second aspect or any preceding implementation of the second aspect, traversing the property graph further comprises eliminating repeated traversals of the property graph for a set of concurrent queries according to the shared neighbor vertices of adjacent vertices and shared vertices among concurrent queries within the edge-set, accessing the edge-set once, and caching data therefrom for re-use.

In an eighth implementation according to the second aspect or any preceding implementation of the second aspect, the method further comprises utilizing dynamic resource allocation during traversals of the property graph to store values for a previous and a current level of the property graph.

A third aspect of the present disclosure relates to a non-transitory computer-readable medium storing computer instructions for concurrently querying a property graph implemented in a distributed network of nodes, that when executed by one or more processors, cause the one or more processors to perform the steps of: determining on a node of a plurality of nodes within the distributed network of nodes a subgraph shard of a plurality of subgraph shards of the property graph, the node storing data for the subgraph shard that contains a range of local vertices that are a subset of all vertices of the property graph, the subgraph shard having boundary vertices that have edges that connect the subgraph shard to boundary vertices of another subgraph shard, the subgraph shard comprising a set of edge-sets containing vertices within a certain range by vertex identifier; receiving concurrent queries of the property graph from at least one user; scheduling a query of the subgraph shard of the plurality of subgraph shards in accordance with an initial vertex for each concurrent user query; traversing the property graph during execution of the concurrent queries by traversing edge-sets within the subgraph shard; and the node sending values of boundary vertices of the subgraph shard to at least one other node having another subgraph shard sharing the boundary vertices using messaging during traversal of the property graph.

The methods described herein can be performed and the instructions on computer readable media may be processed by the apparatus, and further features of the method and instructions on the computer readable media result from the functionality of the apparatus. Also, the explanations provided for each aspect and its implementation apply equally to the other aspects and the corresponding implementations. The different embodiments may be implemented in hardware, software, or any combination thereof. Also, any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 6C illustrates a frontier and visited bit array at each hop of the example graph of FIG. 6A.

FIG. 10A illustrates a response time distribution comparison of 100 concurrent 3-hop queries of the C-Graph system described herein with a Titan system running an OR-100M graph on a single machine.

FIG. 10B illustrates a response time distribution comparison of the C-Graph system described herein with a Gemini system running a Friendster (FR-1B) graph on three machines.

DETAILED DESCRIPTION

Figure 1:
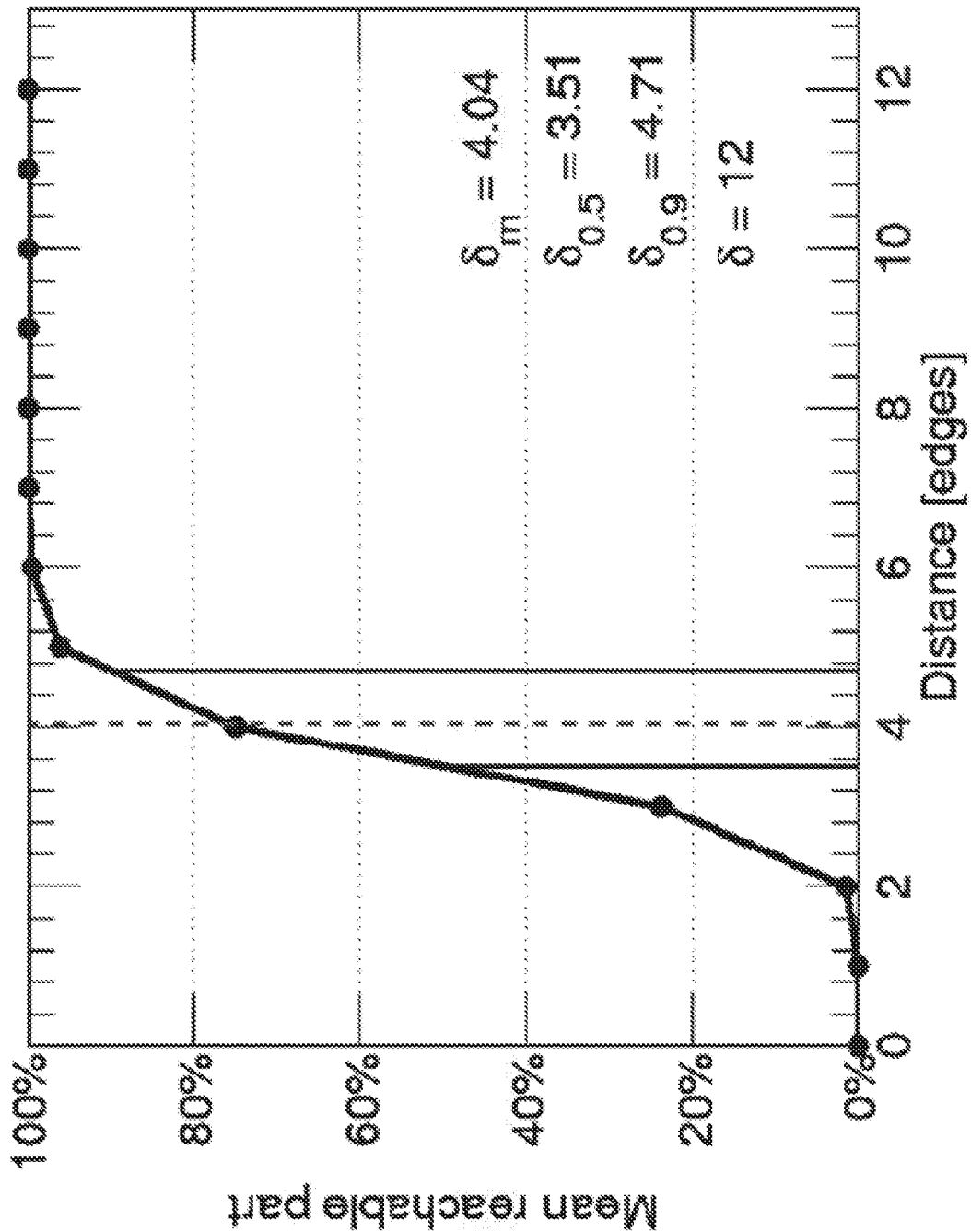
FIG. 1 illustrates a hop plot for Slashdot Zoo graphs.

It should be understood at the outset that although an illustrative implementation of one or more embodiments are provided below, the disclosed systems and/or methods described with respect to FIGS. 1-16 may be implemented using any number of techniques, whether currently known or in existence. The disclosure should in no way be limited to the illustrative implementations, drawings, and techniques illustrated below, including the example designs and implementations illustrated and described herein, but may be modified within the scope of the appended claims along with their full scope of equivalents.

Overview

Many existing graph processing systems focus on parallelism to maximize the efficiency of the execution of a single query or algorithm execution. Concurrency is thus needed to support a number of users simultaneously accessing the graph, which results in resource competition with parallel execution of each individual query. The support of concurrent queries is a requirement for most industrial systems, particularly for cloud-based systems. Concurrency can occur amongst random queries and analytic queries, where the former touches usually a small part of a graph, while the latter usually touches the entire graph. In practice, there is no way to clearly distinguish the two and, accordingly, both analytic and random queries should be well supported. Also, the graph size is typically quite large, and the graph must be updated in time or periodically, thereby necessitating concurrency support for each graph instance. The graph processing system described herein is thus designed to provide efficient concurrency support for cloud applications.

Industrial graph processing systems often traverse extremely large graphs. Despite of the ease of centralized processing, centralized processing is not practical for industrial applications as a machine with a sufficiently large shared memory is prohibitively expensive due to the extremely high cost of super computers. The graph processing system described herein is thus assumed to have a distributed computing mode in its kernel design.

One of the fundamental operations that a graph processing system must handle efficiently is the graph traversal. For example, the "reachability query" is essentially a graph traversal to search for a possible path between two given vertices in a graph. Graph queries are often associated with constraints such as a mandatory set of vertices and/or edges to visit, or a maximum number of hops to reach a destination. In weighted graphs, such as those used in modeling software-defined-networks (SDNs), a path query must be subject to some distance constraint in order to meet quality-of-service latency requirements.

Many real-world applications rely on k-hop, a variant of the classic reachability query problem. In k-hop, the distance from a given node often indicates the level of influence. For example, in wireless, sensor or social networks, the signal/influence of a node degrades with distance. The potential candidate of interest is often found within a small number of hops. Real-world networks are generally tightly connected, making k-hop queries very relevant. According to the "six degrees of separation" principle, which claims that a maximum of six steps are needed to connect any two people, most of the network will be visited within a small number of hops. As a result, k-hop reachability often exists as an intermediate "operator" between low-level database and high-level algorithms. Many higher-level analyses can be described and implemented in terms of k-hop queries, such as triangle counting which is equivalent to finding vertices that are within 1 and 2-hop neighbors of the same vertex. Therefore, a graph processing system's ability to handle k-hop access patterns predicts its performance on higher-level analyses.

Compared to many big data systems, graph processing generally faces significant performance challenges. One such challenge for graph traversals is poor data locality due to irregular data access patterns in many graph problems. As a result, graph processing is typically bound by a platform's I/O latency, rather than its compute throughput. In distributed systems, the overheads of communication beyond machine boundaries, such as network latency, exacerbate I/O bottlenecks faced by graph processing systems.

Another challenge for most existing graph processing frameworks is to efficiently handle concurrent queries. These systems are often optimized to either improve performance or reduce I/O overhead but are not capable of responding to concurrent queries. In enterprise applications, a system usually has to gracefully handle multiple queries at the same time. Also, since multi-user setups are common, several users can send out query requests simultaneously. Graph databases are often designed with concurrency in mind, but they generally have poor performance in graph analysis, especially in terms of handling large scale graphs or high volumes of concurrent queries.

Prior systems that support concurrent queries usually evaluate only small graphs and do not support interactive multi-user distributed environments. Such systems also do not provide communications across graph partitions and do not use inboxes and outboxes for storing the messages across partitions during concurrent traversals. Existing systems also do not provide affinity aware traversal of a property graph for concurrent queries and a stateful frontier representation for respective nodes.

In sample embodiments, the graph processing system that meets these requirements implements an edge-set based graph traversal framework called C-Graph (Concurrent Graph) that runs on a distributed infrastructure. The system reduces overall execution time by leveraging the repeated and collocated vertices during traversals to implement affinity-aware local graph traversal that improves the spatial data locality (two vertices in the same edge-set) and the temporal data locality (vertices shared between queries). Communications across graph partitions are used to support the distributed infrastructure. An inbox and an outbox are provided for each subgraph to store the messages across partitions. Each query also propagates a unique label to mark the traversed edges in an edge-set of the subgraph shard. When a neighbor is remote, it provides messages to the outbox or decodes messages from the inbox. Two-bit arrays are used to represent the local vertices falling into respective partitions (frontiers) and those that have already been visited. The messages sent between the partitions help to determine in the next iteration of graph traversal if a vertex has been visited or not.

One or more embodiments described herein process concurrent local graph traversal tasks such as those in the k-hop reachability query. As both disk I/O and network I/O as elements of the storage bandwidth are considered, the efficiency of each processing unit is improved. The C-Graph framework described herein is designed as a traditional edge-centric sharding-based graph processing system. The main contributions of the C-Graph framework can be summarized as follows:

- A simple range-based partition is adopted to reduce the overhead of complex partitioning scheme for large scale graphs. Multi-mode, edge-set-based graph data structures optimized for sparsity and cache locality are used in each partition to achieve the best performance for different access patterns.
- The C-Graph framework explores data locality between overlapped subgraphs and utilizes bitwise operations and shared global states for efficient graph traversals.

In order to solve the memory limitation of concurrent graph queries in a single instance, dynamic resource allocation during graph traversals are utilized. Instead of saving a value per each vertex, only values for the previous and current levels are stored.

Synchronous/asynchronous update models are supported for different types of graph applications, such as graph traversals and iterative computation (e.g., PageRank).

The C-Graph system targets the reduction of the average response times for concurrent graph queries on large-scale graphs with up to 100 billion edges in distributed environments.

Graph Traversal

A graph is denoted by G=(V, E), where V is a set of vertices and E is a set of edges connecting the vertices; an edge e={s, t, w}∈E is a directed link from vertex s to t, with weight w for a weighted graph. Note that in graph database terminology the weight w can also be referred to as the property of edge e.

Graph traversal is the process of visiting a graph by starting from a given source vertex (a.k.a. the root) and then following the adjacency edges in certain patterns to visit the reachable neighborhood iteratively. Examples of basic graph traversal methods include visiting a graph in breadth-first-search (BFS) and/or depth-first-search (DFS) manners. Most graph applications or queries are essentially performing computations on the vertex values and/or edge weights while traversing the graph structure. For example, the single-source-shortest-path (SSSP) algorithm finds the shortest paths from a given source vertex to other vertices in the graph by accumulating the shortest path weights on each vertex with respect to the root.

The k-hop reachability query is essentially a local traversal in a graph, which starts from a given source vertex and visits vertices within k-hops. It is a widely used building block in graph applications. In practice, the influence of a vertex usually decreases as the number of hops increases. Therefore, for most applications, potential candidates will be found within a small number of hops. In addition, real-world networks are often tightly connected. For example, FIG. 1 illustrates the cumulative distribution of path lengths over all vertex pairs in the Slashdot Zoo network. In this network, the diameter ($\delta$) equals 12. The 50-percentile effective diameter ($\delta_{0.5}$) equals 3.51 and the 90-percentile effective diameter ($\delta_{0.9}$) equals 4.71. Thus, most of the network will be visited with less than 5 hops, which is consistent with the six-degrees-of-separation theory in social networks.

The k-hop query is frequently employed as an intermediate "operator" between low-level databases and high-level algorithms. Many higher-level functions such as triangle counting, which is equivalent to finding vertices that are within 1 and 2-hop neighbors of the same vertex, can be described and implemented in terms of k-hop traversal. Breadth-first search (BFS) is a special case of k-hop, where k→∞. As a result, a graph database's ability to handle k-hop access patterns is a good predictor of its performance.

As noted above, the ability to handle concurrent queries is very important for industrial big data products. However, adding concurrency in graph databases or graph processing systems is challenging. For example, graph databases like Titan, JanusGraph® (based on Titan), and Neo4j® are designed with multi-query/users in mind. However, their performance when executing concurrent graph queries is generally poor. In experiments, Titan took 10 seconds on average to complete 100 concurrent 3-hop queries for a graph of 100 million edges. For some of the queries, the response time was as high as 100 seconds. Other graph databases like Neo4j® are not distributed and cannot, as a result, support many real-world graphs such as web-scale graphs partitioned over multiple machines.

High memory footprint is another challenge for large-scale graph processing. Concurrent graph queries, generally have high memory usage, which can significantly degrade the response times for all queries. As a result, most of the graph processing systems cannot be easily changed to run concurrent queries. These systems are usually highly optimized for certain applications with high resources utilization, but system failures may be triggered when running concurrent queries due to memory exhaustion.

Range-Based Graph Partitioning

Figure 2:
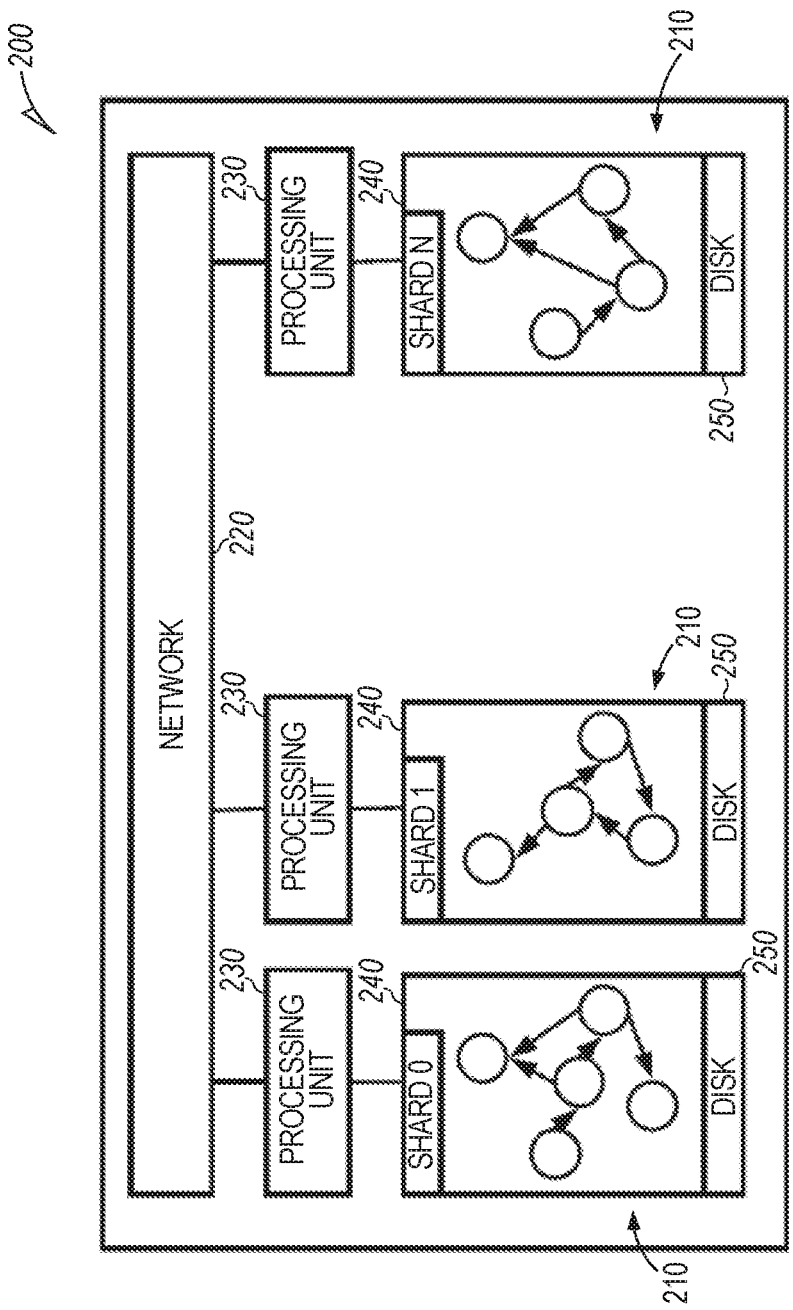
FIG. 2 illustrates an edge-centric sharding-based graph processing system design.

FIG. 2 illustrates an overview of the C-Graph edge-centric sharding-based graph processing framework 200 running on a cluster of computing nodes 210 connected by a high-speed network 220. Each node 210 includes a processing unit 230 with a cached subgraph shard 240. The processing units 230 are CPUs in the framework 200 and can be extended to GPUs or any other graph processing accelerators. Each subgraph shard 240 contains a range of vertices called local vertices, which are a subset of all graph vertices. Boundary vertices with respect to a subgraph shard 240 are vertices from other shards that have edges connecting to the local vertices of the subgraph. Each subgraph shard 240 stores all the associated in/out edges as well as the property of the subgraph. The graph property includes vertex values and edge weights (if the graph is weighted). Each processing unit 230 computes on its own subgraph shard 240 and updates the graph property iteratively. Each processing unit 230 is also responsible for sending the values of boundary vertices to other processing units 230. Structuring the graph processing framework 200 this way allows the decoupling of computation from communication and allows for focusing on improving the computing efficiency of each processing unit 230 based on its available architecture and resources. Then, all communications are treated as an abstraction of the I/O hierarchy (i.e. memory, disk, and network latency). It is noted that a subgraph shard 240 does not necessarily need to fit in memory 250. As a result, the I/O cost may also involve local disk I/O.

Graph partitioning is an important step in optimizing the performance of a graph processing system where the input graphs cannot fit into a node's memory. Many system variables such as workload balance, I/O cost, etc., are often considered when designing a graph partitioning strategy. There can be different optimal partition strategies depending on the graph structure and application behavior. Moreover, re-partitioning is often required when graphs change, which is costly for large-scale graphs. In sample embodiments, the solution to this problem is to adopt a lightweight low-overhead partitioning strategy. The C-Graph framework 200 deploys a simple range-based partition similar to those by GraphChi, GridGraph, Gemini, etc. The C-Graph framework 200 assigns vertices to different partitions based on vertex ID, which is re-indexed during graph ingestion. Each partition contains a continuous range of vertices with all associated in/out edges and subgraph properties. To balance the workload, each partition may be optimized to contain a similar number of edges. In a p-node system, a given graph G=(V, E) will be partitioned into p continuous subgraphs $G_i=(V_i, E_i)$, where i=0, 1, ..., p−1. In each $G_i$, $V_i$ are local vertices and $E_i$ is a set of edges {s, t, w}, where either source s or destination t belongs to $V_i$. The rest of the vertices in other partitions are boundary vertices. Such assignment of all out-going edges of a vertex to the same partition is a way of improving the efficiency of local graph traversals. Incoming edges are stored when running graph algorithms such as PageRank.

Multi-Modal Edge-Set Based Graph Representations

Multi-modal graph representations may be adopted into the C-Graph framework 200 to accommodate different access patterns and achieve best data locality for different graph applications. Compressed sparse row (CSR) is a common storage format to store the graph. It provides an efficient way to access the out-going edges of a vertex, but it is inefficient when accessing the incoming edges of a vertex. To address this inefficiency, the incoming edges are stored in compressed sparse column (CSC) format, and out-going edges in compressed sparse row (CSR) format.

Figures 3A, 3B:
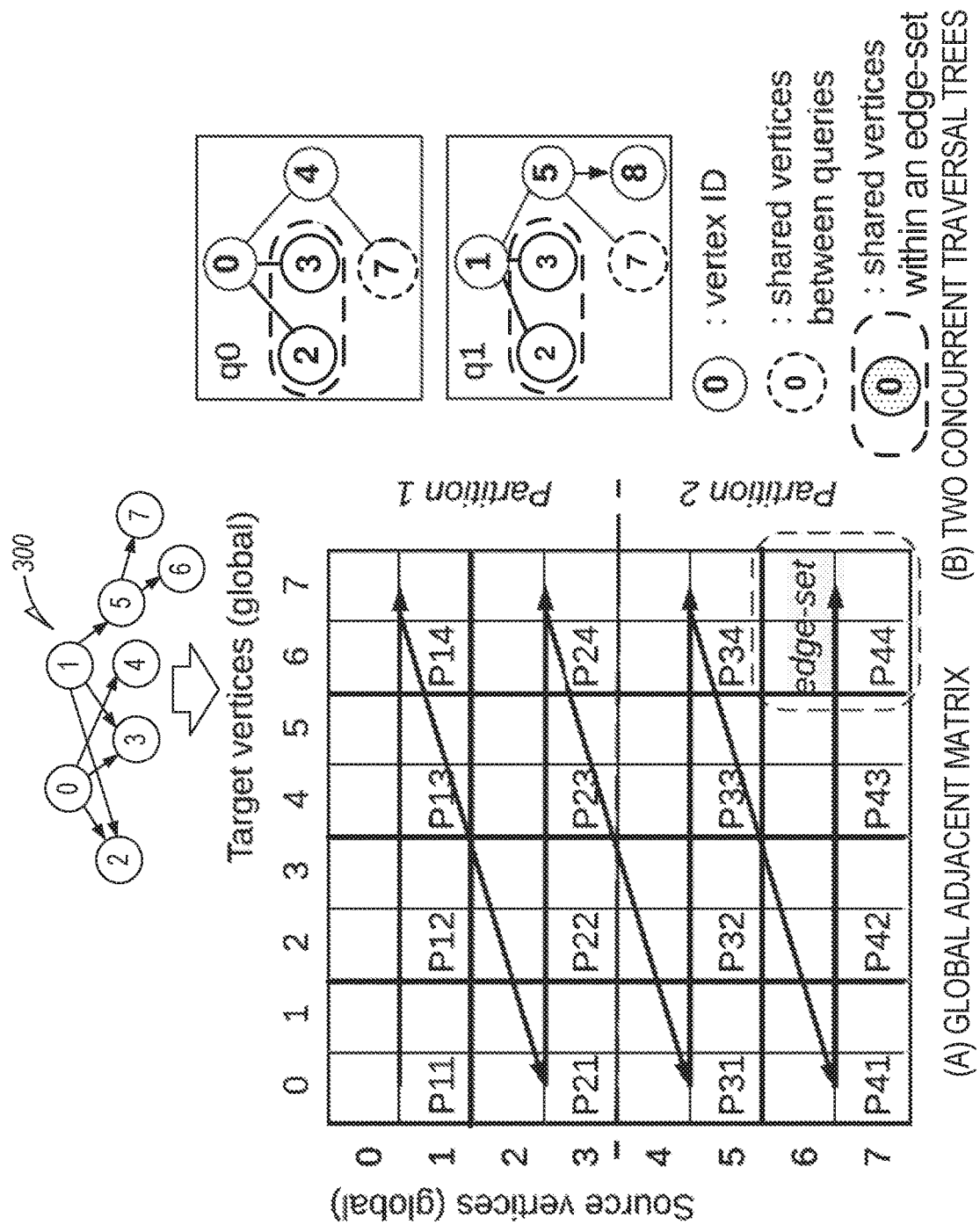
FIG. 3A illustrates a global adjacency matrix of an edge-set based graphic representation divided into two sub-graph partitions, with each partition converted into 8 edge-sets whereby traversing the graph through out-going edges is equivalent to scanning the edge-sets in left-right pattern.
FIG. 3B illustrates a graph for affinity-aware traversal of trees for two concurrent queries where the first three levels are illustrated.

To improve cache locality, the graph processing system described herein uses iterative graph computing with an edge-set based graph representation. Similar to the range-based graph partitioning noted above, each subgraph partition is further converted into a set of edge-sets. Each edge-set contains vertices within a certain range by vertex ID. FIG. 3A illustrates a global adjacency matrix of an edge-set based graphic representation divided into two subgraph partitions, with each partition converted into 8 edge-sets whereby traversing the graph through out-going edges is equivalent to scanning the edge-sets in left-right pattern. As shown in FIG. 3A, an input graph 300 having vertices 0-7 is represented in global adjacency matrix format and is divided into two partitions, with each partition converted into eight edge-sets (p11, p12, p13, p14, p21, p22, p23, p24 for partition 1 and p31, p32, p33, p34, p41, p42, p43, p44 for partition 2). To traverse a graph through out-edges, the global adjacency matrix illustrated in FIG. 3A is scanned left to right.

Generating edge-sets is straightforward. Vertex degrees are obtained after partitioning the input graph 300 across machines, and then the vertices of each subgraph are divided into a set of ranges by evenly distributing the degrees. Next, the edge list is scanned again, and each edge is allocated to an edge-set according to the ranges into which source and destination vertices fall. Finally, within each edge-set, the CSR/CSC format is generated using local vertex IDs calculated from global vertex ID and partition offset. The pre-processing reduces the complexity of global sorting and is conducted in a divide- and conquer manner.

The granularity of an edge-set is chosen such that the vertex values and associated edges fit into the last level cache (LLC). However, the sparse nature of real large-scale graphs can result in some tiny edge-sets that consist of only a few edges each, if not empty. Loading or persisting many such small edge-sets is inefficient due to the I/O latency. Therefore, small edge-sets that are likely to be processed together are consolidated so that data locality is potentially increased. Consolidation can occur between adjacent edge-sets both horizontally and vertically. The horizontal consolidation improves data locality especially when the out-going vertex edges are visited. Vertical consolidation benefits the information gathering from the vertex's parents.

Concurrent graph traversals can benefit from edge-set representation from two dimensions of locality maintained inside an edge-set in at least two ways: 1) shared neighbor vertices of frontiers within an edge-set, and 2) shared vertices among queries. FIG. 3B illustrates a graph for affinity-aware traversal of trees for two concurrent queries where the first three levels are illustrated. In the simple example shown in FIG. 3B, two concurrent queries q0 and q1 are presented, each by a graph traversal tree of three levels. Visiting neighbors of vertex 2 and 3 takes just one pass on edge-sets $P_{1i}$, $_i$=0, 1, 2, 3, and since these two vertices are shared among both queries, query performance can be improved by making only one traversal on these two vertices. The compute engine performs user-defined functions on edges within each edge-set in parallel. Edge-set graph representation also improves cache locality for iterative graph computations like PageRank from two aspects: 1) sequential accesses to edges within a local graph, and 2) write locality preserved by storing the edges in CSC format. Updating the vertex value array in ascending order also leads to better cache locality while enumerating the edges in an edge-set.

Such concurrent graph traversals using edge-set representation enables affinity-aware graph traversal optimization. As noted above, graph local traversal (e.g., k-hop) is a fundamental operation of the implementation of many queries and/or graph analysis algorithms. Graph local traversal receives as input a root vertex, traversal depth, and optional traversal filters and provides as output visited vertices using user defined functions (e.g., mark visited vertices). It is generally recognized that in a block adjacent matrix representation of a graph as shown in FIG. 3A that traversing a graph through out-going edges is equivalent to scanning the blocks (edge-sets) in a left-right pattern. Thus, given a set of concurrent queries, two kinds of affinity may be identified: 1) the shared vertices among queries, and 2) shared vertices within an edge-set. For both kinds of affinity, the graph processing system only accesses the shared edge-set once and caches the data for re-use. Concurrent query performance is thus improved by eliminating repeated traversals for a set of queries in accordance with the identified affinity.

Query Processing

Efficient implementation of a distributed graph engine requires balancing computation, communication and storage. The C-Graph framework supports both the vertex-centric and partition-centric models. The partition-centric model is specifically optimized to handle graph traversal-based algorithms such as k-hop and BFS. The performance of such models depends strongly on the quality of the graph partitions.

Figure 4:
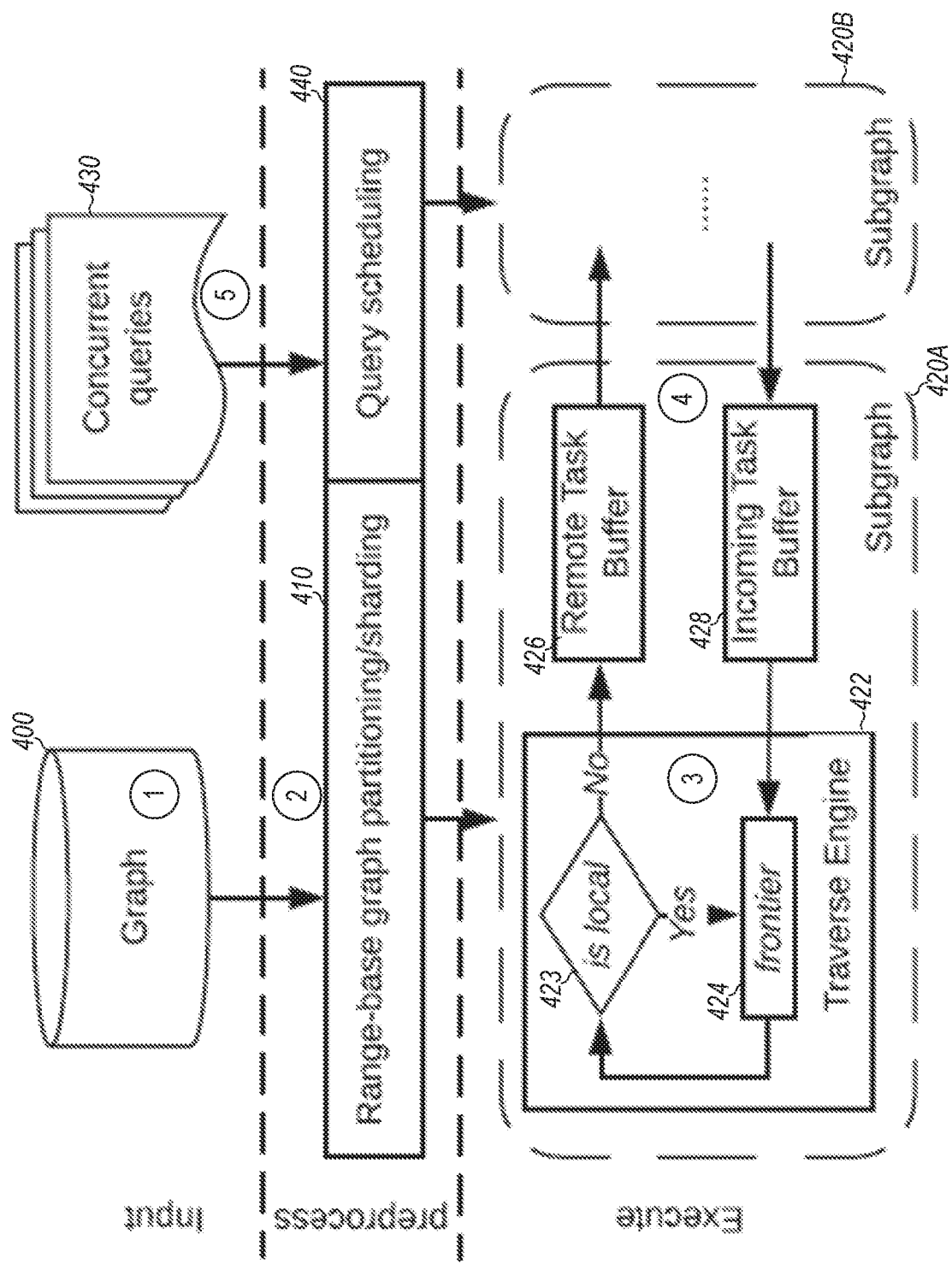
FIG. 4 illustrates a graph query workflow in a sample embodiment.

FIG. 4 illustrates a graph query workflow in a sample embodiment. In particular, FIG. 4 illustrates the graph traversal iterations in the partition-centric model, which generally requires fewer supersteps to converge compared to the vertex-centric model. In the partition-based model, vertices can be classified into local vertices and boundary vertices. The values for local vertices are stored in the local partition, while boundary vertex values are stored in the remote partitions. Local vertices communicate with boundary vertices through messages. A vertex can send a message to any other vertices in the graph using the destination vertex's unique ID.

In FIG. 4, input software enables the graph processing system to ingest a graph 400 from a given data source into the graph processing system. To enable concurrent queries in sample embodiments, preprocessing software includes range-based graph partitioning/sharding software 410 that partitions the input graph 400 into a set of subgraphs as described above. Execution software of each subgraph 420A, 420B, etc. assigns its subgraph to a traverse engine 422 for distributed traversal, which includes determining whether the next node to be traversed is local or not at 423. If so, the traverse engine 422 processes the next node in the frontier at 424 and traverses to the next node in the subgraph. However, when it is determined at 423 that the next node to be traversed is not local, a message is generated by the first subgraph 420A that is put into an outbox of a remote task buffer 426 for transmittal to a second subgraph 420B containing the next node to be processed. During traversal of the subgraph 420A, the traverse engine 422 also reads messages from other subgraphs (e.g., subgraph 420B) that are received in an inbox of the incoming task buffer 428 from the outbox of a remote task buffer 426 of another subgraph 420B.

As illustrated in FIG. 4, the input software also enables the graph processing system to receive concurrent queries 430 that are to be performed across subgraphs 420A, 420B, etc. of the graph 400. The concurrent queries 430 are scheduled by a query scheduler 440 of the preprocessing software. The query scheduler 440 accesses the vertices in the edge-sets of the property graph and assigns the vertices to subgraphs. The scheduled queries are input into starting points of respective subgraphs 420 for subgraph traversal. As appropriate, messages are read by each subgraph from its incoming task buffer 428 that are received from the remote task buffer 426 of a remote subgraph during traversal.

Thus, the graph query workflow in FIG. 4 includes the steps (1)-(5) identified in FIG. 4 as:

1. Ingest graph 400 from a given data source into the graph processing system;
2. Partition the input graph 400 into a set of subgraphs 420;
3. Assign each subgraph 420 to a traverse engine 422 for distributed traversal;
4. Communicate across subgraphs 420 to execute a query as needed; and
5. Perform concurrent queries across subgraphs 420A, 420B, etc. by using affinity-aware local subgraphs traversal to identify common edges and communicating across subgraphs.

Using the graph query workflow of FIG. 4, overall execution time is reduced by leveraging the repeated and collocated vertices during traversals, which is essentially to improving the spatial data locality (e.g. two vertices in the same edge-set) and temporal data locality (vertices shared between queries). Also, the graph query workflow of FIG. 4 provides concurrent traversal frontier synchronization on very large-scale graphs by using distributed computation of the respective subgraphs and communication across the graph partitions of concurrent traversal frontiers. As illustrated with respect to FIG. 5 below, the graph processing system clarifies that the traversal frontier, when given a traversal task, provides a list of vertices to visit in the next iteration. The distributed frontier is found in each iteration, and the communications described herein are used to find the traversal frontier across subgraphs. Given a set of traversal tasks, the frontiers are found simultaneously, rather than processing one by one. For example, an inbox in the incoming task buffer 428 of each subgraph and an outbox in the remote task buffer 426 of each subgraph store the cross-partition messages for execution. In sample embodiments, each query propagates a unique label to mark the traversed edges in an edge-set of a subgraph shard. When a neighbor vertex is remote, the subgraph 420 forms messages to the outbox of the remote task buffer 426 or decodes a message from the inbox of the incoming task buffer 428.

In general, the frontiers are found concurrently and synchronized by starting from each root and propagating a distinct label to each neighbor vertex. A vertex can receive multiple labels if it appears in multiple traversal tasks. The inbox and outbox are used to buffer labels to send to/receive from other subgraphs. Affinity can be identified and used to limit traversals. The resulting concurrent traversal frontier synchronization and communication across graph partitions enables queries on very large-scale graphs to use distributed computation. The inbox and outbox for each subgraph store the cross-partition messages. For example, each query propagates a unique label to mark the traversed edges in an edge-set of a subgraph shard. When a neighbor is remote, a message to the outbox is formed. Also, messages from an inbox are decoded during subgraph traversal.

As will be explained below with respect to FIG. 6, compact stateful representation for concurrent traversal across subgraphs 420 may be implemented using two-bit arrays that compactly represent the local vertices falling into frontiers and those that have been visited already. In sample embodiments, each subgraph utilizes two bit arrays, one for marking vertices in frontiers and the other for verifying those vertices that have been visited. Each bit array is of size N by k, where N is the number of vertices in the local subgraph and k is the number of concurrent queries. The messages in combination with the two bit arrays enable the graph processing system to determine in the next iteration of graph traversal if a vertex has been visited or not. The stateful frontier representation proceeds by starting from the query roots and marking the frontier bit array and the visited bit array. Unvisited neighbors are found and populated into the frontier. For all vertices in the frontier, their neighbors are checked to determine if they have been visited before and, if not, the neighbors are visited. The process then again finds unvisited neighbors and populates them into the frontier to repeat the visitation check. Utilization of a bit-map reduces memory storage space consumption and also makes set operations, such as set unions, easy to implement efficiently. The state message stored in the bit arrays helps determine in the next iteration if a vertex has been visited or not.

To illustrate the partition-centric model, two operations are considered: local read and remote write, both of which incur cross-partition communications. Local read is performed when reading the value of a boundary vertex. For example, the PageRank value of a local vertex is calculated from all the neighboring vertices, some of which are boundary vertices. In this case, a locally updated vertex value is synchronized across all partitions after each iteration. In other cases, a partition may need to update the value of a boundary vertex of the partition. For example, in subgraph traversals involving traversing depth, when a boundary vertex is visited, its depth needs to be updated remotely. The boundary vertex ID with its value along a traverse operator will be sent to the partition to which it belongs. In that partition, the vertex value will be asynchronously updated and the traversal on that vertex will be performed based on the new depth. In a sense, all vertices are updated locally to achieve the maximum performance through efficient local computation, and all changes of the graph property are exchanged proactively across partitions using high speed network connections. A simple example of subgraph traversal is shown in FIG. 5.

Figure 5:
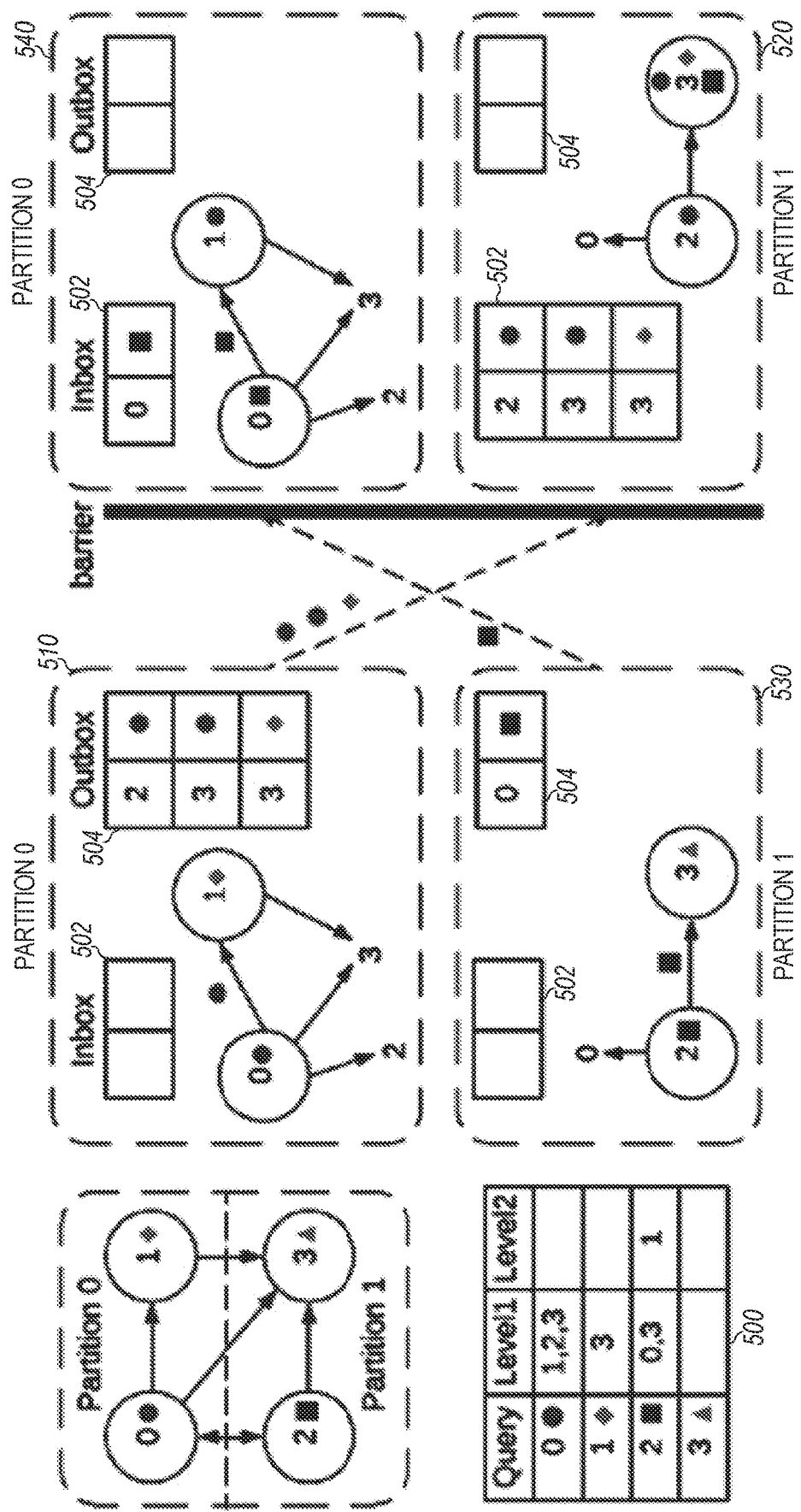
FIG. 5 illustrates a simple, two-partition graph example with four concurrent graph traversals starting from all four vertices where different queries are distinguished using different symbols, each partition has an inbox buffer for incoming tasks and an outbox buffer for outgoing tasks, and each task is associated with the destination vertex's unique ID.

FIG. 5 illustrates a simple, two-partition graph example (partition 0 and partition 1 for vertices (0)-(3)) with four concurrent graph traversals shown in table 500 starting from all four vertices where different queries are distinguished using different symbols. Each partition has an inbox buffer 502 for incoming tasks and an outbox buffer 504 for outgoing tasks, and each task is associated with the destination vertex's unique ID. The visited vertices are synchronized after each iteration and will not be re-visited.

As illustrated at 510 for partition 0, the query represented by the circular symbol from vertex 0 proceeds to vertex 1 as partition 0 is traversed. However, since vertices 2 and 3 are not in partition 0 but are in partition 1, the query represented by the circular symbol from vertex 0 to neighboring vertices 2 and 3 in the graph are placed into the outbox 504 for communication to vertices 2 and 3 in partition 1. Similarly, since vertex 3 is not in partition 0 but is in partition 1, the query represented by the diamond symbol from vertex 1 to neighboring vertex 3 is also placed into the outbox 504 for communication to vertex 3 in partition 1. As illustrated, the outbox 504 at 510 for partition 0 is provided to the inbox 502 of partition 1 at 520. As illustrated, the query represented by the circular symbol traverses vertex 2 and also traverses vertex 3 as vertex 3 is in the same partition 1. Also, the query represented by the diamond symbol from vertex 1 also traverses vertex 3 upon being read from the inbox 502.

Also, as illustrated at 530 for partition 1, the query represented by the square symbol from vertex 2 proceeds to vertex 3 as partition 1 is traversed. However, since vertex 1 is not in partition 1 but is in partition 0, the query represented by the square symbol from vertex 2 to neighboring vertex 0 in the graph is placed in the outbox 504 for communication to vertex 0 in partition 0. As illustrated at 540, the outbox 504 at 530 for partition 1 is provided to the inbox 502 of partition 0 at 540. As illustrated, the query represented by the square symbol traverses vertex 0 and also traverses vertex 1 as vertex 1 is in the same partition 0. These symbols in the vertices thus mark the traversals of each query through the subgraphs.

Thus, to synchronize the current query frontier, the graph processing system start from each root and propagates a distinct label to each neighbor vertex. A vertex can receive multiple labels if it appears in multiple traversal tasks. An inbox and outbox are used to buffer labels to send to and receive labels from other subgraphs. Affinity can be identified in this step by recognizing common labels.

Concurrent queries can be executed individually in request order or processed in batches to enable subgraph sharing among queries. To mitigate the memory pressure in concurrent graph queries, dynamic resource allocation is utilized during graph traversals. Only values of vertices in previous and current levels need to be kept, instead of saving value per vertex during the entire query.

Programming Abstraction

In a sample embodiment, an interface is provided for the partition-centric model. The interface may be similar to that first introduced by Giraph++™, which has been quickly adopted and further optimized. Listing 1 shows the interface of the basic methods call in the partition-centric model.

| Listing 1: Partition-centric Model | |
|---|---|
| 1 | void abstract compute ( ); |
| | void sendTo (V destination, M msg); |
| 3 | void voteTohalt ( ); |
| | bool ifHasVertex (V vid); |
| 5 | bool isLocalVertex (V vid); |
| | bool isBoundaryVertex (V vid); |
| 7 | Collection getLocalVertices ( ); |
| | Collection getBoundaryVertices ( ); |
| 9 | Collection getAllVertices ( ); |
| | void barrier ( ); |

In sample embodiments, two functions are provided to accommodate different categories of graph applications: a) graph traversal on graph structure and b) iterative computation on graph property. Graph traversal involves data-intensive accesses and limited numeric operations. The irregular data access pattern leads to poor spatial locality and introduces significant pressure on the memory subsystem. On the other hand, computation on graph property often involves more numeric computation which shows hybrid workload behaviors. The graph traversal pattern is defined in the Traverse function, and the iterative computation is defined in the Update function. An example of a k-hop Traversal implementation is shown in Listing 2.

```
    def Traverse(task queue: Q, hops: k) {
2       while any s in Q {
            if (s.hops < k) {
4               if ( isLocalVertex( s)) {
                    for (t in s.neighbors and !visited(t)) {
6                       t.hops = s.hops + 1
                        if (isLocalVertex(t)) Q.push(t)
8                       else sendTo (t, t.hops)
                        visited(t) = true
10                  }
                }
12          }
            Q.pop(s)
14      }
    }
```

In Listing 2, for each vertex in a local task queue, neighbor vertices are visited and put into two queues based on local vertices that will be inserted into the local task queue while boundary vertices will be sent to a remote task queue. All neighbors are marked as visited and shared cross all processing units. The maximum depth of traversal is defined by hops k.

In sample embodiments, the Update function is an implementation of the Gather-Apply-Scatter (GAS) model by providing a vertex-programming interface. A PageRank example using the GAS interface is shown in Listing 3. The function looks no different than a normal GAS model graph processing framework. However, the present implementation does not generate additional traffic in the gather phase since all edges of a vertex are local.

```
1       def Gather(v, sum) sum += v.val
        def Apply(v, sum) v.val = 0.15 + 0.85 * sum
3       def Scatter(v) v.val / v.outdegree
```

In Listing 3, the gather phase collects inbound messages. The apply phase consumes the final message sum and updates the vertex data. The scatter phase calculates the message computation for each edge.

Concurrent Queries Optimization

The concurrent queries are further optimized by leveraging several state-of-art techniques. In practice, it is inefficient to use a set or queue data structure to store the frontier since the union and set operations are expensive with a large number of concurrent graph traversals. In addition, the dramatic difference in frontier size at different traversal levels introduces dynamic memory allocation overhead. It also requires a locking mechanism if the frontier is processed by multiple threads. Instead of maintaining a task queue or set, the approach introduced in MS-BFS to track concurrent graph traversal frontier and visited status has been implemented in C-Graph and extended to distributed environments. For example, for each query, 2 bits are used to indicate if a vertex exists in the current or next frontier, and 1 bit is used to track if it has been visited. A fixed number of concurrent queries are decided based on hardware parameters, for example, the length of the cache line. The frontier, frontierNext and visited values are stored in arrays for each vertex to provide constant-time access.

Figure 6B:
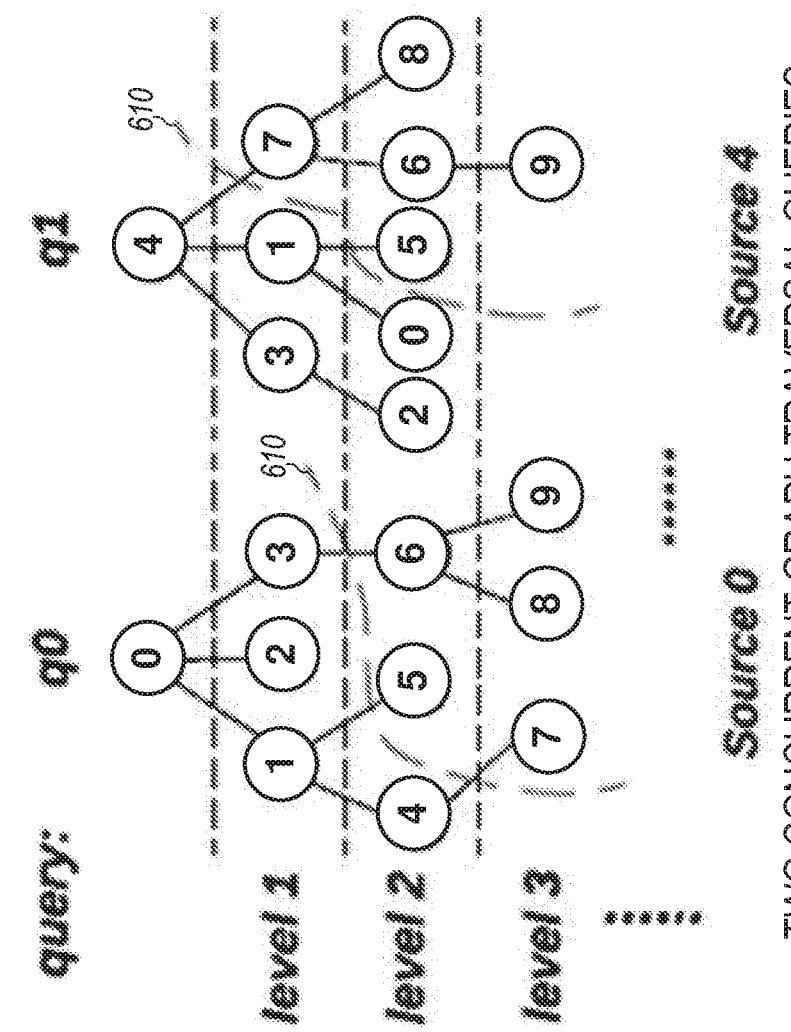
FIG. 6B illustrates two concurrent graph traversal queries based on the example graph of FIG. 6A.
Figure 6A:
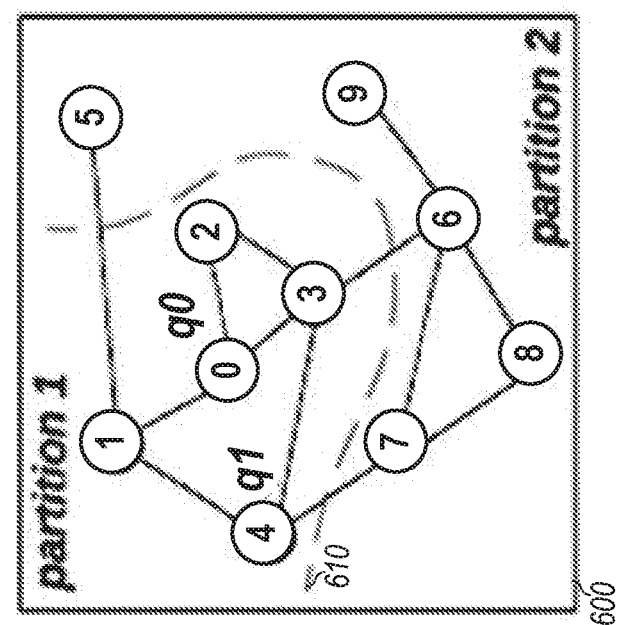
FIG. 6A is an example graph of bit operations for two concurrent queries.

FIG. 6A is an example graph of bit operations for two concurrent queries. As illustrated, an example graph 600 with 10 vertices (0)-(9) is divided into two partitions on two machines using range-based partitioning. Partition 0 contains vertices V:{0~4}, and partition 1 contains vertices V:{5~9}. Each partition maintains a frontier and visited bit array for each query.

FIG. 6B illustrates two concurrent graph traversal queries based on the example graph of FIG. 6A. FIG. 6B shows the traversal tree for concurrent queries q0 starting at source vertex 0 and q1 starting at source vertex 4. Level 1 identifies the vertices 1-hop away; Level 2 identifies the vertices 2-hops away; Level 3 identifies the vertices 3-hops away, and the like in the graph 600. As illustrated, the hops may occur across the partition boundary 610.

FIG. 6C illustrates the bit array representations for frontier and visited nodes at each hop of the example graph of FIG. 6A. The frontier in the current hop is from frontierNext in the previous level. Each row represents a vertex ((0)-(9)), and each column represents a query (q0, q1). The queries share the same vertices in each iteration, and data locality is preserved if updating concurrent queries at the same time. The corresponding bit arrays shown in FIG. 6C illustrate the changes in the bit arrays after each hop side by side. The shaded "X" s indicate that a vertex is being visited in the current hop, and the unshaded "X" s indicated that a vertex has been visited during a previous hop.

As illustrated in FIG. 6C, at the initial traversal state, only vertex 0 has been visited for query q0 and only vertex 4 has been visited for query q1. However, after 1 hop, query q0 has visited vertices (1), (2), and (3), while query q1 has visited vertices (1), (3), and (7). Thus, after 1 hop, query q0 has visited vertices (0), (1), (2), and (3) and query q1 has visited vertices (1), (3), (4), and (7). After 2 hops, query q0 has visited vertices (4), (5), and (6), while query q1 has visited vertices (0), (2), (5), (6), and (8). Thus, after 2 hops, query q0 has visited vertices (0), (1), (2), (3), (4), (5), and (6) and query q1 has visited vertices (0), (1), (2), (3), (4), (5), (6), (7), and (8). Finally, after 3 hops, query q0 has visited vertices (7), (8), and (9) and query q1 has visited vertex (9). Thus, after 3 hops, q0 and q1 have visited all vertices (0)-(9) in example graph 600. The two-bit array of FIG. 6C provides a simple and convenient way to track the visits during each hop.

Processing Workflow

Figure 7:
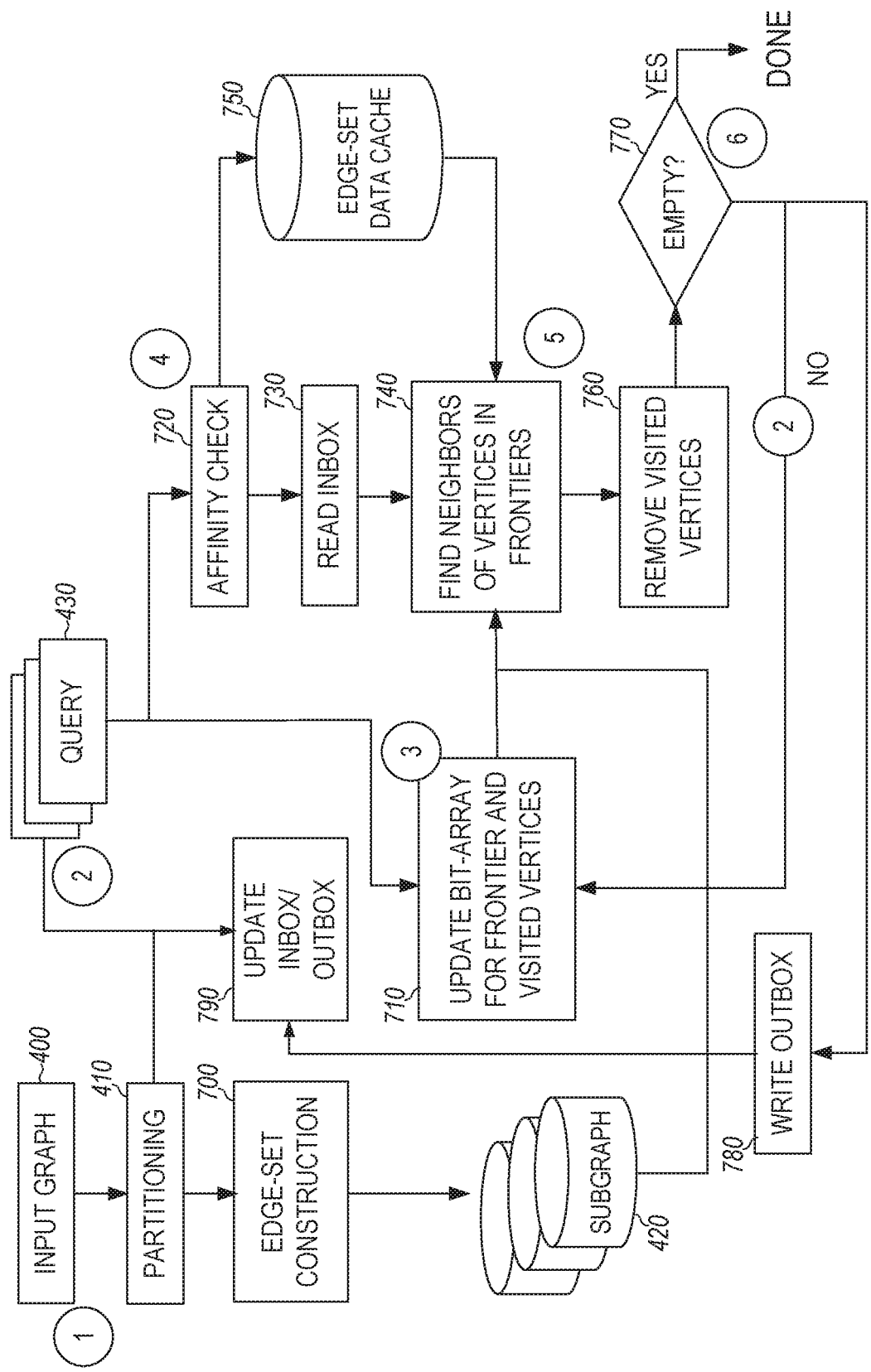
FIG. 7 illustrates a summary of the workflow that provides affinity aware traversal of a graph, concurrent frontier sync-up, and stateful frontier representation in sample embodiments.

FIG. 7 illustrates a summary of the workflow that provides affinity aware traversal of a graph, concurrent frontier sync-up, and stateful frontier representation in sample embodiments. As illustrated in FIG. 7, the workflow of the graph processing device inputs graph 400 at (1) and partitions the graph 400 using, for example, the range-based graph partitioning/sharding software 410 described above with respect to FIG. 4. The partitioning constructs edge-sets at 700 for each subgraph 420 as described above. Concurrent queries 430 input at (2) traverse the subgraphs and update the bit-arrays for the frontier and visited vertices at 710 ((3)) as described above with respect to FIG. 5 and FIG. 6. An affinity check of the bit-arrays is performed at 720 ((4)), and the inboxes of the subgraphs are read at 730 to process the messages at 740 during the process of finding neighbors of vertices in frontiers at (5) taken from the edge-set cache 750 within the same partition or across partitions as described above. Vertices that have been visited are removed at 760. If all vertices in the subgraph have been visited, the edge-set data cache is determined to be empty at 770, and the process concludes at (6). However, if there are more vertices to visit, the query tokens are written to the outbox at 780 and the corresponding inboxes and outboxes of the affected subgraphs are updated at 790. The bit array is updated for the frontier and the visited vertices at 710 (FIG. 6), and the subgraph traversal continues the query ((2)) until all vertices have been visited.

Figure 8A:
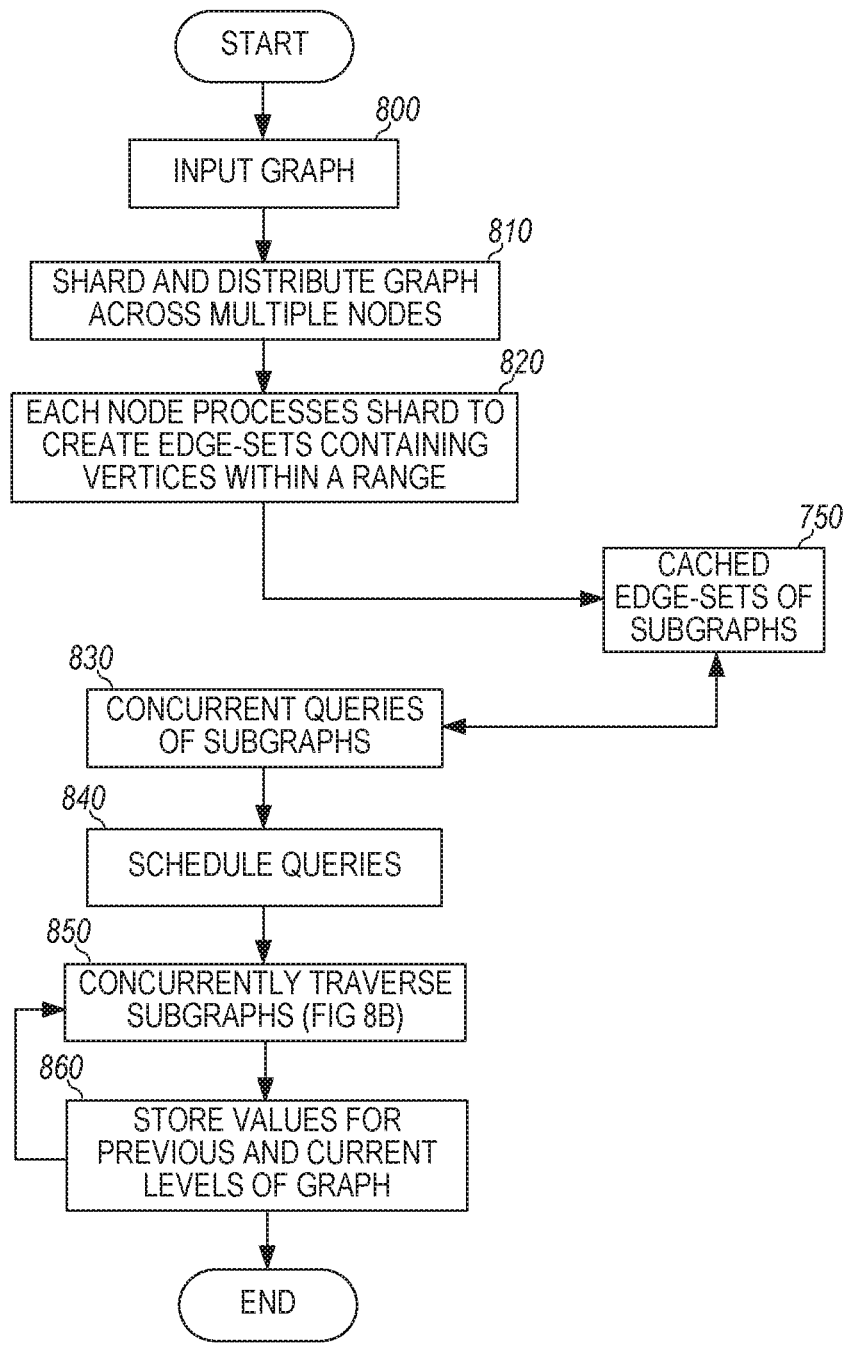
FIG. 8A illustrates a flow chart of a graph processing system of a sample embodiment.

FIG. 8A illustrates a flow chart of a graph processing system for concurrent property graph queries of a property graph where the property graph is implemented in a distributed network of nodes in a sample embodiment. In the sample embodiments, the property graph is input at 800 and sharded and distributed across multiple processing nodes using range-based graph partitioning techniques at 810. The respective processing nodes within the distributed network of nodes process respective subgraph shards of the property graph to be queried at 820. In the sample embodiments, each processing node includes a processing unit with a subgraph shard containing a range of local vertices that are a subset of all vertices of the property graph. Also, each subgraph shard has boundary vertices having edges that connect the subgraph shard to boundary vertices of another subgraph shard whereby the respective shards together represent the entire property graph. The respective processing nodes convert each subgraph shard into a set of edge-sets containing vertices within a certain range by vertex ID at 820. The edge-sets of the subgraphs are cached at 750. In response to concurrent queries of the property graph from at least one user at 830, the queries of the subgraph shards are scheduled at 840 in accordance with an initial vertex of the cached edge-sets for each concurrent user query. The respective subgraphs are concurrently traversed at 850 during execution of the concurrent queries by traversing edge-sets within a subgraph on each node. The graph processing system also uses dynamic resource allocation during traversals of the property graph and stores values for a previous and a current level of the property graph at 860. The process may repeat until the queries have visited all relevant nodes.

Figure 8B:
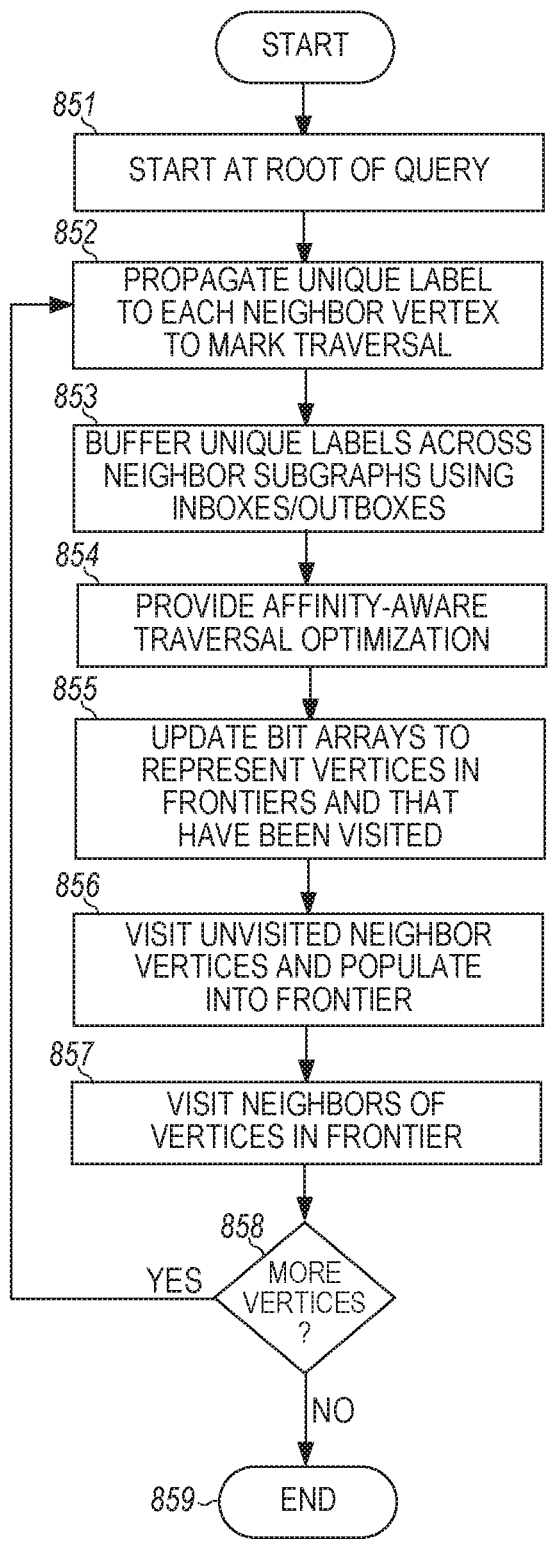
FIG. 8B illustrates the traversal of the subgraphs as implemented in a sample embodiment.

FIG. 8B illustrates the traversal of the subgraphs in step 850 in more detail. First, when issuing a query on a given node in a distributed environment, the root of a query will be put into the frontier or the outbox depending on if the root is a local vertex or a boundary vertex. The property graph is traversed during execution of the concurrent queries by starting from each root at 851 and propagating a unique label to each neighbor vertex to mark traversed edges in an edge-set of the subgraph shard at 852.

During each level traversal, similar to dealing with the root of a query as in step 851, the unvisited neighbor vertex is put into the frontier or the outbox with unique label depending on if the neighbor vertex is a local or a boundary vertex. So, before traversing a level of graph, the frontier will check if the inbox has any incoming requests and update the bit arrays as well as apply the optimization. The inbox and outbox are used at 853 to buffer the unique labels to send/receive from neighbor subgraphs in the distributed network of nodes.

Traversing the property graph at 850 also includes traversing (1) shared neighbor vertices of adjacent vertices to visit in a next iteration of traversal of the subgraph within an edge-set and (2) shared vertices among concurrent queries only one time for the concurrent queries by providing affinity-aware traversal optimization at 854.

At 855, two-bit arrays are updated to represent the local vertices falling into respective partitions (frontiers) and those that have already been visited, where each bit array is of size N by k, where N is the number of vertices in a local subgraph and k is the number of concurrent queries.

Unvisited neighbors are visited at 856 and populated into the frontier representation.

Then, for all vertices in the frontier representation, their neighbors are visited at 857 to determine if the respective vertices have been visited before. This process repeats at 858 until all neighbors in the subgraph have been checked by the query. The traversal will complete when all neighbor vertexes are visited or the level of traversal reaches the number of k-hop queries, which is the maximum level to traverse for a given root and is a user-defined query parameter.

Once all vertices in the subgraph have been checked, the query ends at 859.

Experimental Evaluation

To evaluate the efficiency of the graph processing system described herein and its optimizations, the system performance was measured using both real-world and semisynthetic graph datasets. The system was tested with various types of graph algorithms, and experimental results reported on scalability with respect to input graph size, number of machines and number of queries. The performance of the graph processing system with open-source graph database Titan and state-of-the-art graph processing engine Gemini was compared.

Experimental Setup

In the experimental evaluation, two graph algorithms were used to show the performance of the graph processing system running different types of graph applications.

A K-Hop Query is a fundamental algorithm for graph traversals and was used to evaluate the performance of concurrent queries. Most of the experiments were based on the 3-hop query, which traverses all vertices in a graph that are reachable within 3 hops from the given source vertex. For each query, a frontier queue and visited status were maintained for each vertex. Initially all vertices were set as not visited, and frontier contained the source vertex. The level of a visited vertex or its parent was recorded as vertex value. The unvisited neighbors of the vertices in the frontier were added to the frontier for the next iteration. The details of the implementation are illustrated in Listing 2 above. The main factor used to evaluate the performance of the query system is the response time for each query in a concurrent queries environment. Between 10 to 350 concurrent queries were tested, and the query time for each query was reported.

PageRank is a well-known algorithm that calculates the importance of websites in a websites graph. In PageRank, all vertices are active during the computation. The vertex page-rank value is updated after gathering all the neighbors' page-rank values. In experiments, 10 iterations were run for performance comparison. An illustration of the implementation using the GAS (Gather-Apply-Scatter) API is shown in Listing 3 above, with the sum value for each vertex initialized to zero. Although the graph processing system is mainly used for k-hop queries, PageRank was used to evaluate the iterative graph computation applications, which have different access patterns compared to graph traversals.

Most of the experiments were conducted on a 9 server machines cluster, each with an Intel® Xeon® CPU E5-2600 v3, having a total of 44 cores at 2.6 GHz and 125 GB main memory. The system and all algorithms were implemented in C++11, compiled with GCC 5.4.0, and executed on Ubuntu 16.4. Socket and MPI (Message Passing Interface) were used for network communications.

During evaluation, an experiment was conducted with both real-world and semi-synthetic datasets. Two real world graphs were used: Orkut and Friendster from SNAP, and two semi-synthetic graphs. Both are generated from Graph 500 generator with Friendster to test the system's ability to process graphs at different scales. Orkut and Friendster are on-line social networks where users form friendships with each other. Orkut has 3 million vertices and 117 million edges with a diameter of 9, while Friendster has 65.6 million and 1.8 billion edges with a diameter of 32. Both graphs form large connected components with all edges. Two semi-synthetic graphs were generated with a Graph 500 generator and a Friendster graph. Given a multiplying factor m, the Graph 500 generator produced a graph having m times the vertices of Friendster, while keeping the edge/vertex ratio of Friendster. The smaller semi-synthetic graph has 131.2 million vertices and 72.2 billion edges, and the larger semi-synthetic graph has 985 million vertices and 106.5 billion edges. The details of each graph are shown in Table 1 below.

TABLE 1

| Experimental Datasets | Vertices | Edges |
| --- | --- | --- |
| Orkut (OR-100M) | 3,072,441 | 117,185,083 |
| Friendster (FR-1B) | 65,608,366 | 1,806,067,135 |
| Friendster-Synthetic (FRS-72B) | 131,216,732 | 72,224,268,540 |
| Friendster-Synthetic (FRS-100B) | 984,125,490 | 106,557,960,965 |

Experimental Results

The open-source graph database Titan was used, which supports concurrent graph traversals, as a baseline. Since Titan took hours to load a large graph, a small graph Orkut was used to compare the single machine performance running Orkut on Titan with the graph processing system described herein. The internal APIs provided by Titan were used for both graph traversals and PageRank. Experimentation was done with the well-known open-source graph database Neo4j®. However, this system was even slower to load and traverse than a large graph. Therefore, Neo4j® was not included in the comparison.

Before discussing the experimental results, it must be noted that an important quality metric of an online business like a website or a database is response time. There is a strong correlation between response time and business metrics since wait time heavily impacts user experience. To quantify the performance impact on a query, the following three thresholds are defined:

Users view response time as instantaneous (0.1-0.2 second): Users can get query results right away and feel that they directly manipulate data through the user interface.

Users feel they are interacting with the information (1-5 seconds): They notice the delay but feel that the system is working on the query. A good threshold is under 2 seconds.

Users are still focused on the task (5-10 seconds): They keep their attention on the task. This threshold is around 10 seconds. Productivity suffers after a delay above this threshold.

According to the above thresholds, one could reasonably expect a distributed graph processing system to respond to a set of (e.g., 100-300) concurrent queries within a few seconds (e.g., 2 seconds).

System Performance

The concurrent 3-hop query and PageRank performance was compared with the graph database Titan on a single machine. 100 concurrent queries were run for both systems, with each query containing 1.0 source vertices. The source vertices were randomly chosen, with each system performing 1000 random subgraph traversals to avoid both graph structure and system biases. The average response time for a query was calculated from the 10 subgraph traversals of each query, and average response times for 100 queries are shown in FIG. 9, sorted in ascending order.

Figure 9:
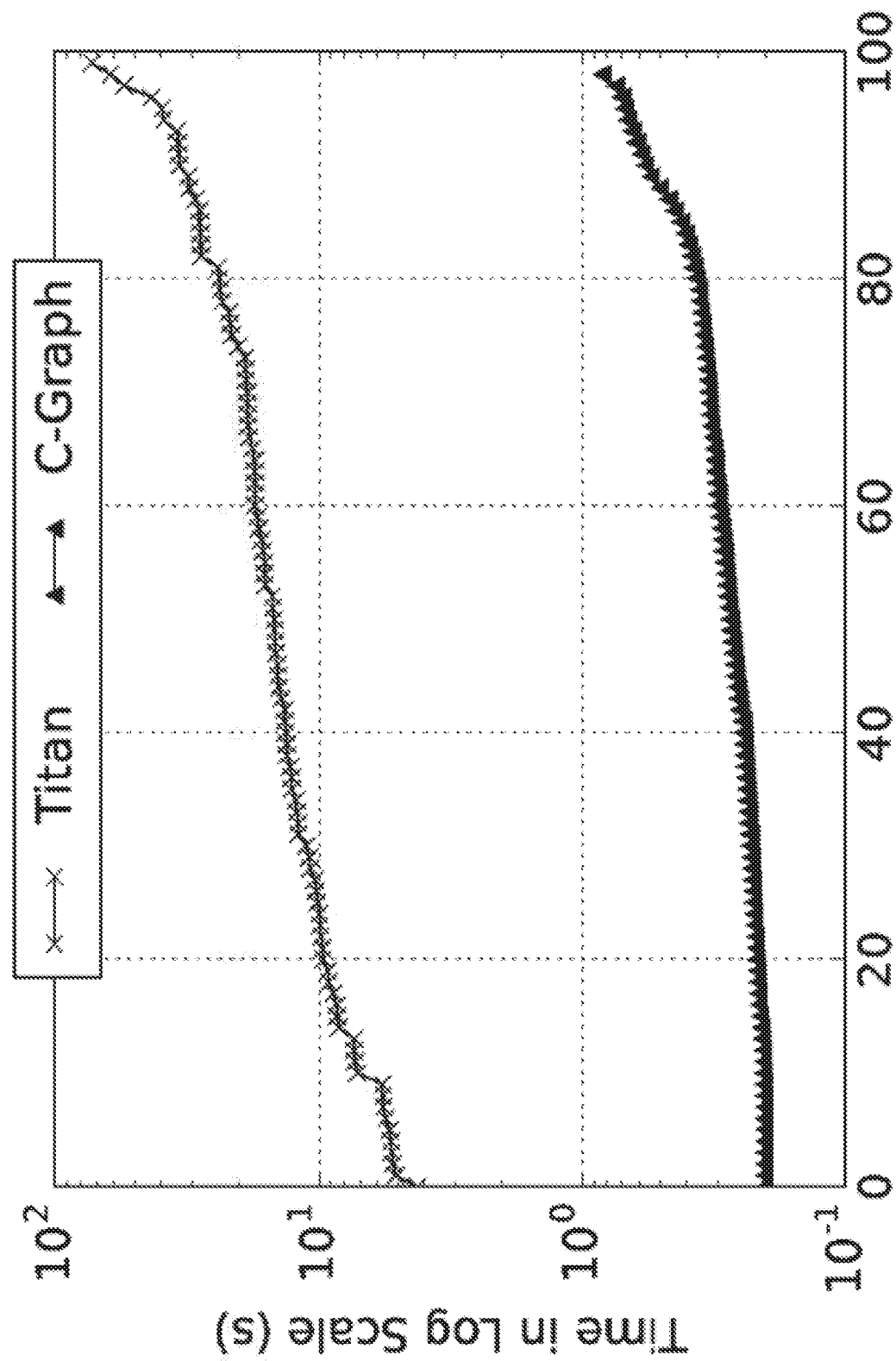
FIG. 9 illustrates a single machine performance comparison of 100 concurrent 3-hop queries of the C-Graph system described herein with a Titan system running an OR-100M graph.

The results shown in FIG. 9 demonstrate the C-Graph graph processing system achieving a 21×-74× speedup over Titan. Moreover, the C-Graph processing system described herein exhibited a much lower upper bound on query time, with all 100 3-hop queries returning within 1 second, while Titan took up to 70 seconds for some queries. In addition, the C-Graph processing system described herein showed much lower variation in response time.

The distribution of all 1000 subgraph traversal times was also compared, with the results shown in FIG. 10A. The average query response time was 8.6 seconds for Titan, and only 0.25 second for C-Graph. About 10% of the queries in Titan took more than 50 seconds and up to hundreds of seconds. This is likely due to the complexity of the software stack used in Titan, such as the data storage layers and Java virtual machine. These inefficiencies make the results for PageRank running on Titan even worse. For the Orkut (OR-100M) graph, Titan execution time was hours for a single iteration while C-Graph only took seconds. Overall, the C-Graph processing system showed both better and more consistent performance gains compared to Titan.

Most existing graph processing systems lack the ability to handle concurrent queries in large-scale graphs. Gemini was used as an example of how inefficient a design that lacks concurrency can be.

Simply using an alternative way instead of re-designing the concurrent support by, for example, making Gemini start with multiple source vertices, will fail. In these systems, concurrently-issued queries are serialized, and a query's response time will be determined by any backlogged queries in addition to the execution time for the current query. Three machines were used to repeat the 100 queries with the Friendster (FR-1B) graph on both systems. The response time distribution is shown in FIG. 10B. Even though Gemini is very efficient and only takes tens of milliseconds for a single 3-hop query, the average query response time is around 4.25 seconds due to the stacked up wait time. The average response time for C-Graph is only about 0.3 seconds.

Experiments also were run to focus on the scalability of the C-Graph processing system utilizing different input graph datasets, increasing the number of machines and query counts.

For concurrent queries, an important performance indicator is how the upper bound of the response time scales as the input graph size increases. A good query system should guarantee that all queries return within latencies that are acceptable to the users. To understand how the C-Graph graph processing system described herein scales with increased input graph size, response times were measured for different datasets: Orkut (OR-100M) with 100 million edges, Friendster (FR-1B) with 1 billion edges, and Friendster-Synthetic (FRS-100B) with 100 billion edges.

Figure 11:
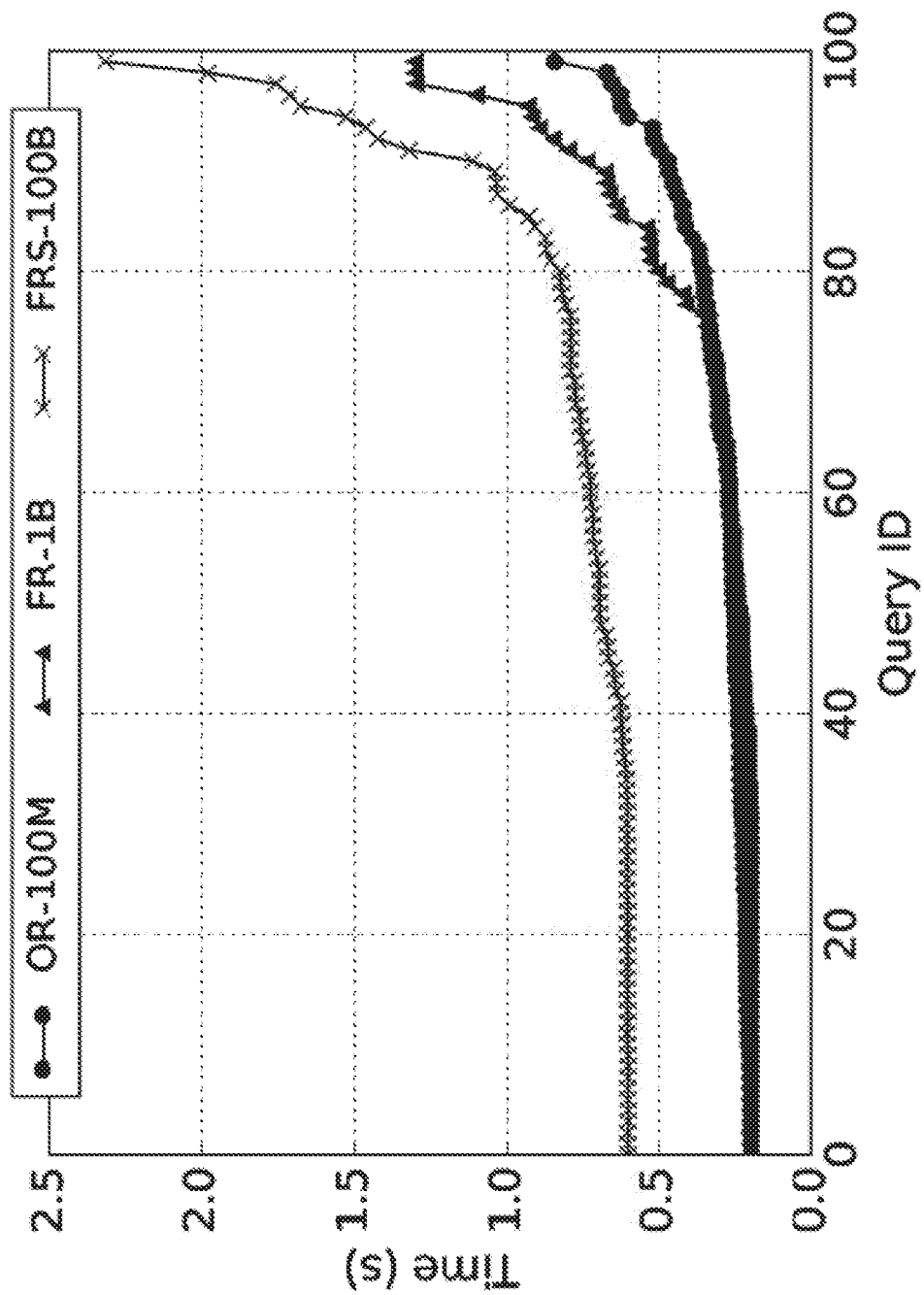
FIG. 11 illustrates the data size scalability results of response times for 100 concurrent 3-hop queries.

FIG. 11 shows the histogram of response time for 100 concurrent 3-hop queries running different graphs with 9 machines. It can be observed that for both graphs, about 85% of the queries return within 0.4 second for FR-1B, and for FRS-100B the response time slightly increases to 0.6 second for the same percentage of queries. The upper bound of query response time is 1.2 seconds for FR-1B, and for FRS-100B it increases slightly to 1.6 seconds. The upper bound of response time for both graphs is within the 2.0 seconds threshold. It is noted that the response time highly depends on the average degree of root vertices, which is 38, 27, 108 for OR-100M, FR-1B and FRS-100B, respectively.

The scalability of the C-Graph processing system described herein was studied with an increasing number of machines. Experimentation was conducted on both types of applications: PageRank and concurrent 3-hop queries.

Figure 12:
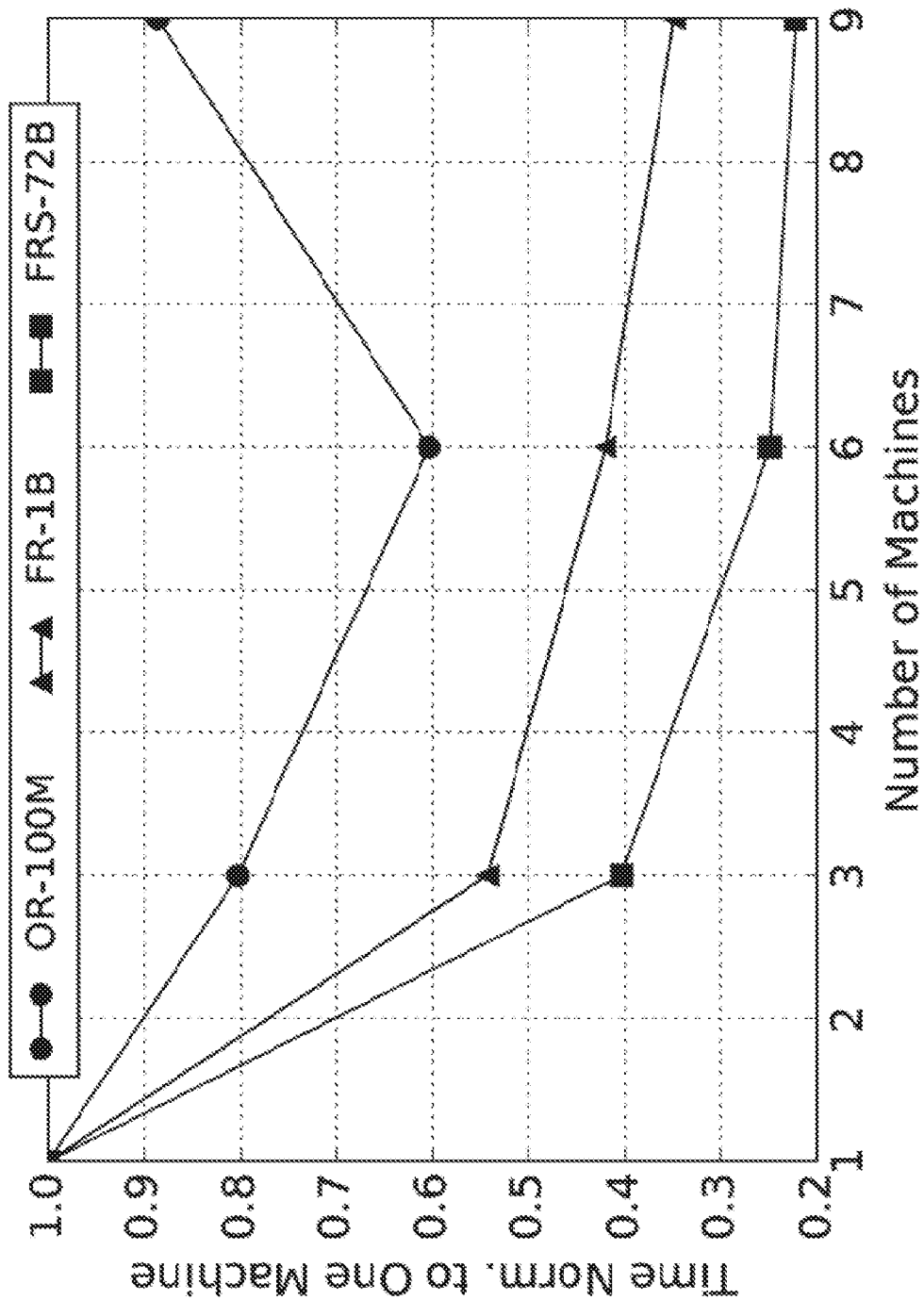
FIG. 12 illustrates multi-machine scalability results for PageRank.

The inter-machine scalability was examined using 1 to 9 machines to run PageRank on graph datasets OR-100M, FR-1B and FRS-72B. The results are shown in FIG. 12. All results are normalized to single machine execution time of corresponding graph. Overall the scalability is very good. For the FR-1B graph, it achieves speedup of 1.8×, 2.4×, and 2.9× using 3, 6 and 9 machines, respectively. With more machines, the inter-machine synchronization becomes more challenging. In the smallest graph OR-100M, as expected, the scalability becomes poor beyond 6 machines as communication time dominates the execution. Better scalability was observed with the largest graph FRS-72B, achieving up to 4.5× speedup with 9 machines.

Figures 13A, 13B:
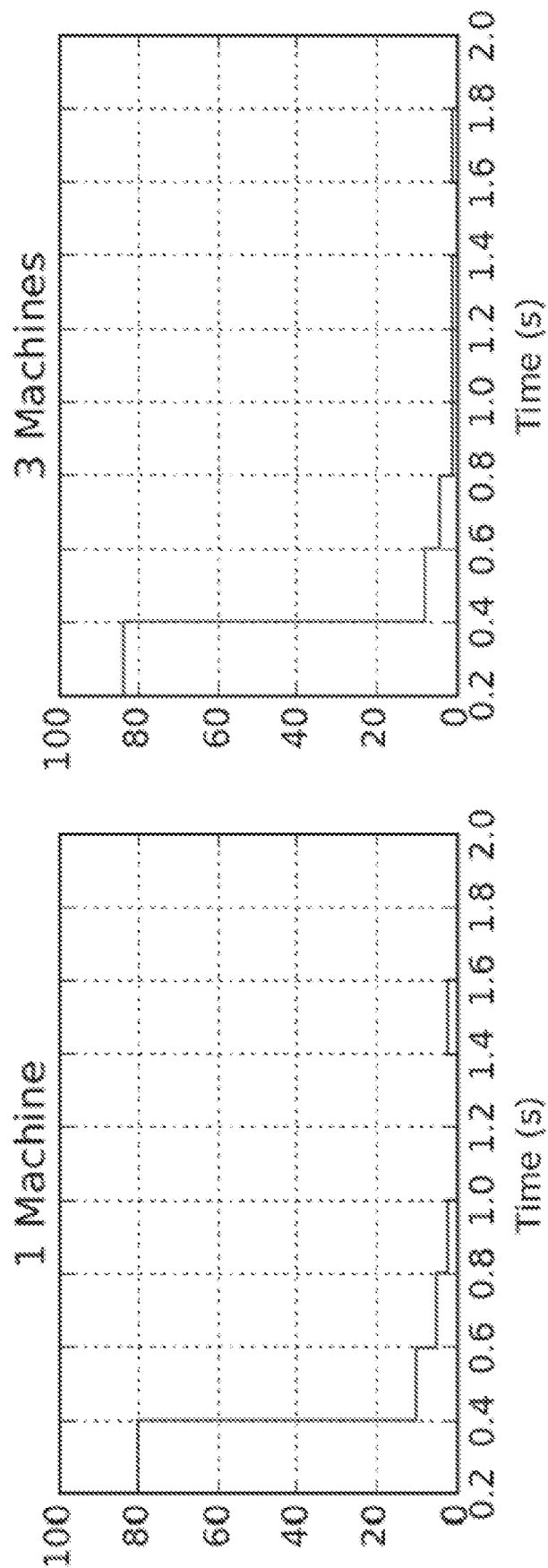
FIGS. 13A-13D illustrate the multi-machine scalability results for 100 queries with FR-1B graph for 1 machine (FIG. 13A), 3 machines (FIG. 13B), 6 machines (FIG. 13C), and 9 machines (FIG. 13D).
Figure 13D:
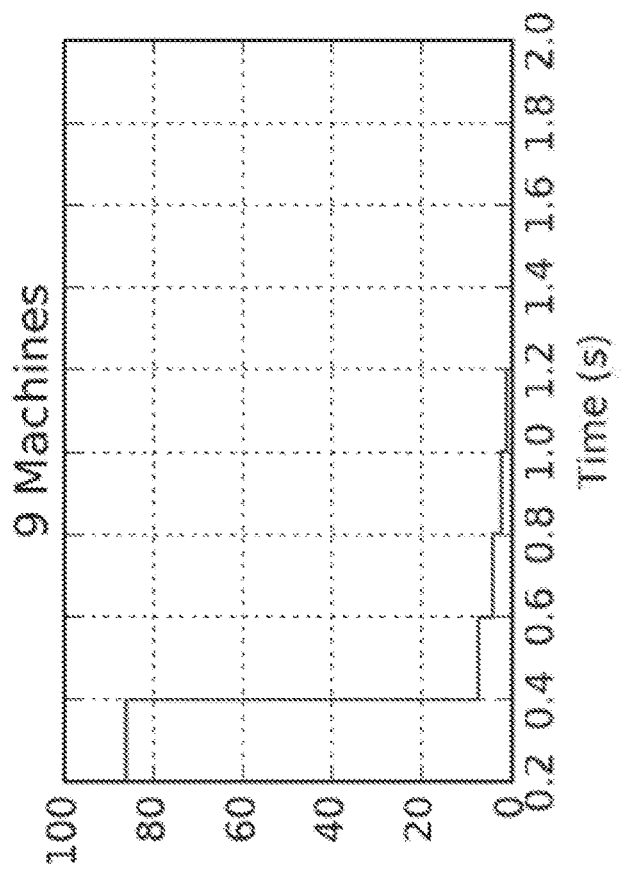
Figure 13C:
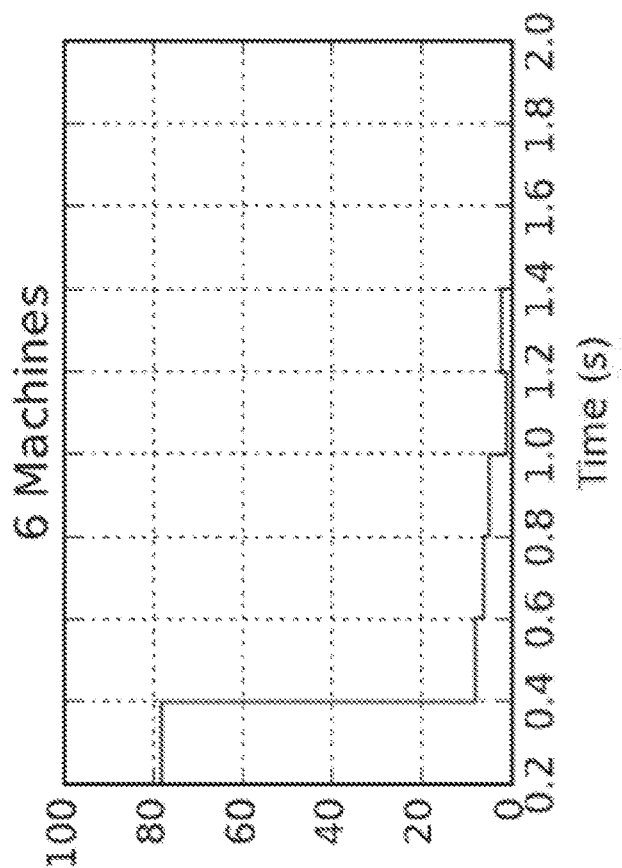

FIGS. 13A-13D depict the response time distribution for 100 concurrent k-hop queries on a single graph using different number of machines. In particular, FIGS. 13A-13D illustrate the multi-machine scalability results for 100 queries with FR-1B graph for 1 machine (FIG. 13A), 3 machines (FIG. 13B), 6 machines (FIG. 13C), and 9 machines (FIG. 13D). While the machine number increases, most of the queries were able to be completed in a short time (i.e., 80% queries receive a response within 0.2 seconds, and 90% queries finish within one second). For a fixed amount of concurrent traversal queries, as the number of machines used increases, the number of visited distinct vertices does not vary, while the number of boundary vertices increases significantly. More boundary vertices lead to increased communication overhead for synchronization. In the C-Graph framework, the partition-centric model was employed and combined with the edge-set technique to solve this problem.

Figures 14A, 14B:
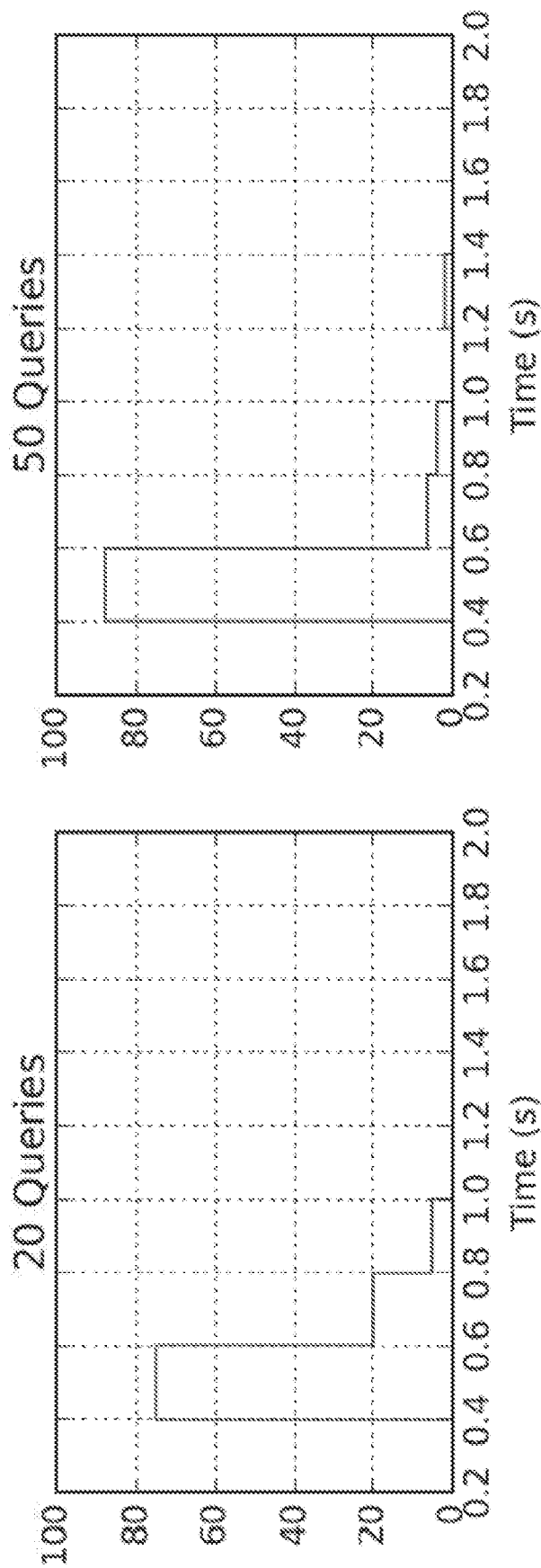
FIGS. 14A-14D illustrate the 3-hop query count scalability results for a FRS-100B graph for 20 queries (FIG. 14A), 50 queries (FIG. 14B), 100 queries (FIG. 14C), and 350 queries (FIG. 14D).
Figures 14C, 14D:
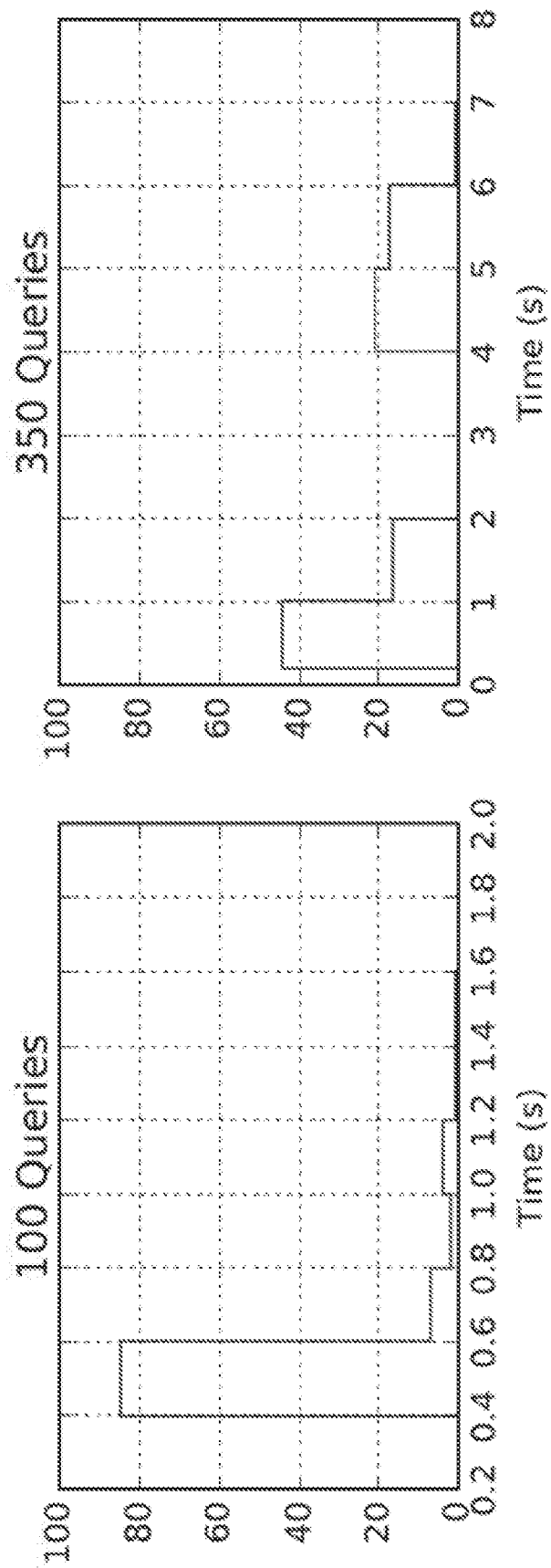

As noted above, the main goal of the C-Graph framework is to execute concurrent graph queries efficiently. To evaluate this property, the scalability of the C-Graph framework was studied as the query count increased. FIGS. 14A-14D show the response time distribution for increasing number of concurrent 3-hop queries running the FRS-100B graph on 9 machines. In particular, FIGS. 14A-14D illustrate the 3-hop query count scalability results for a FRS-100B graph for 20 queries (FIG. 14A), 50 queries (FIG. 14B), 100 queries (FIG. 14C), and 350 queries (FIG. 14D). For up to 100 concurrent 3-hop queries, most of the queries can finish in a short time. 80% of the queries are completed within 0.6 seconds, and 90% queries finish within one second. When the concurrent query count reaches 350, the performance of C-Graph begins to degrade. About 40% queries can respond within one second, and 60% queries can finish within the 2 seconds threshold. There is a wait of 4 to 7 seconds for the remaining queries. The slowdown of the C-Graph framework is mainly caused by resource limits, especially due to the large memory footprint required for concurrent queries. Since every query returns with found paths, the memory usage increases linearly with the query count.

Figure 15:
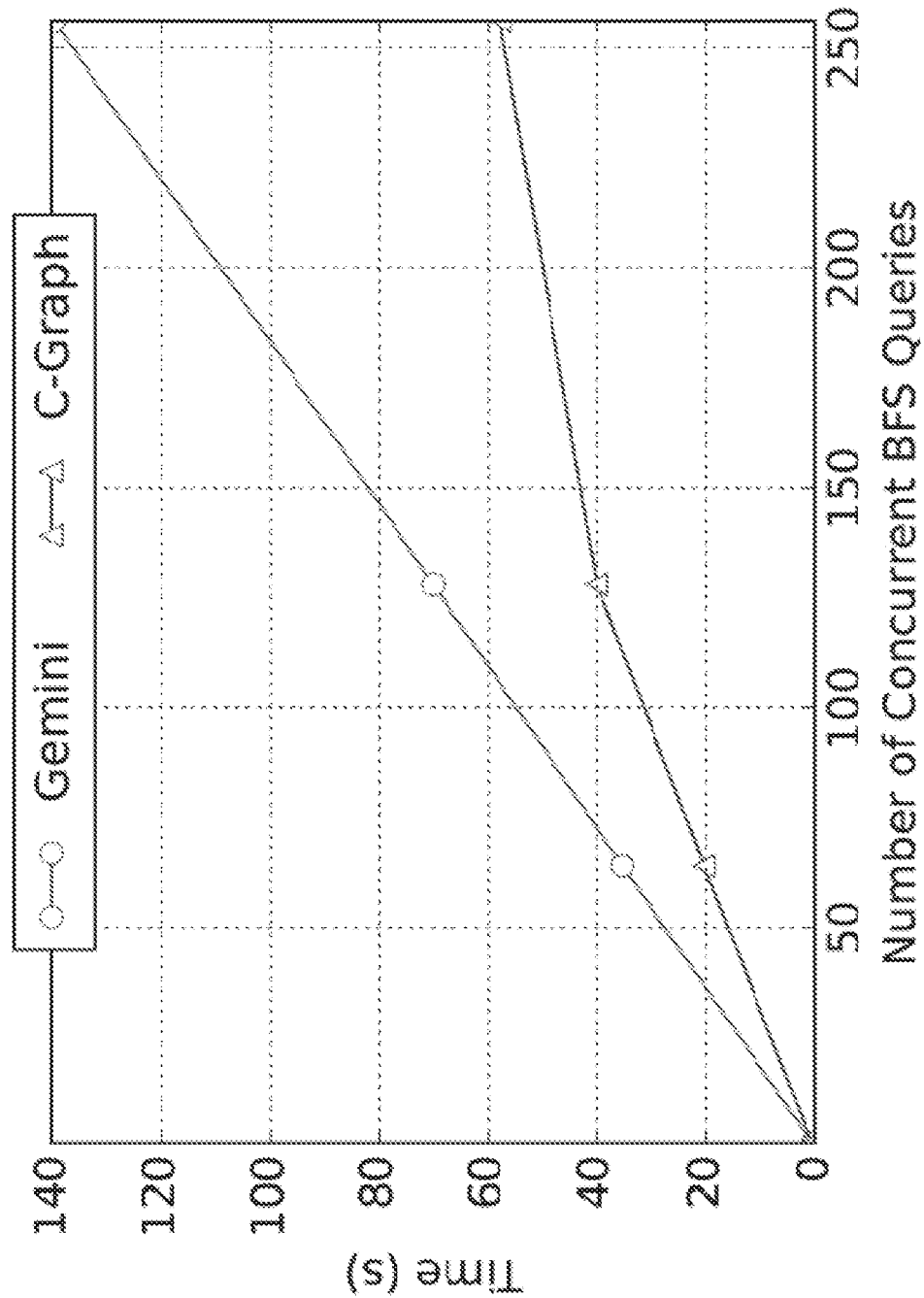
FIG. 15 illustrates a performance comparison of concurrent BFS queries using the C-Graph system described herein and a Gemini system running a FR-1B graph on three machines.

Further comparisons were made regarding the performance and scalability of C-Graph to Gemini to maximize the query hops. Experiments were done with 1, 64, 128 and 256 concurrent BFS queries using the Friendster (FR-1B) graph on 3 machines. Since Gemini does not support concurrent queries, total execution time is reported for serialized queries running on Gemini. Also, because the C-Graph processing framework reaches the system's memory limit when running higher number of hops with more than 25 concurrent BFS queries, hit operations were enabled. The query paths were not recorded. FIG. 15 illustrates the performance comparison of concurrent BFS queries using the C-Graph system described herein and a Gemini system running a FR-1B graph on three machines. As FIG. 15 shows, the execution time for Gemini is linear with the number of concurrent BFS queries. C-Graph starts with the same performance for a single BFS which is completed in about 0.5 seconds. However, C-Graph execution time increases sublinearly with the number of concurrent BFS queries. As a result, C-Graph outperforms Gemini by about 1.7× at 64 and 128 concurrent BFSs, and 2.4× at 256 concurrent BFSs.

Computer Architecture

Figure 16:
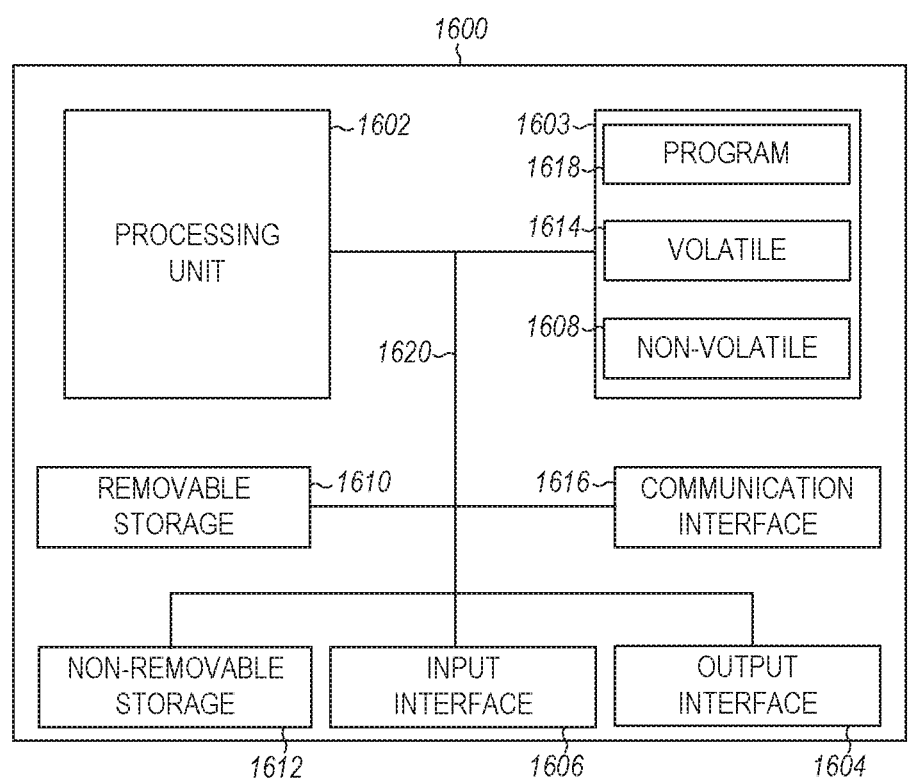
FIG. 16 illustrates a block diagram of example computer processing resources for implementation of one or more sample embodiments.

FIG. 16 is a block diagram illustrating circuitry in the form of a processing system for implementing systems and methods of implementing the graph processing system as described above with respect to FIGS. 1-15 according to sample embodiments. All components need not be used in various embodiments. One example computing device in the form of a computer 1600 may include a processing unit 1602, memory 1603, removable storage 1610, and non-removable storage 1612. Although the example computing device is illustrated and described as computer 1600, the computing device may be in different forms in different embodiments. For example, the computing device may instead be a smartphone, a tablet, smartwatch, or other computing device including the same or similar elements as illustrated and described with regard to FIG. 16. Devices, such as smartphones, tablets, and smartwatches, are generally collectively referred to as mobile devices or user equipment. Further, although the various data storage elements are illustrated as part of the computer 1600, the storage may also or alternatively include cloud-based storage accessible via a network, such as the Internet or server-based storage.

Memory 1603 may include volatile memory 1614 and non-volatile memory 1608. Computer 1600 may include— or have access to a computing environment that includes—a variety of computer-readable media, such as volatile memory 1614 and non-volatile memory 1608, removable storage 1610 and non-removable storage 1612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1600 may include or have access to a computing environment that includes input interface 1606, output interface 1604, and a communication interface 1616. Output interface 1604 may include a display device, such as a touchscreen, that also may serve as an input device. The input interface 1606 may include one or more of a touchscreen, touchpad, mouse, keyboard, camera, one or more device-specific buttons, one or more sensors integrated within or coupled via wired or wireless data connections to the computer 1600, and other input devices.

The computer 1600 may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular. Wi-Fi, Bluetooth, or other networks. According to one embodiment, the various components of computer 1600 are connected with a system bus 1620.

Computer-readable instructions stored on a computer-readable medium are executable by the processing unit 1602 of the computer 1600, such as a program 1618. The program 1618 in some embodiments comprises software that, when executed by the processing unit 1602, performs operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1618 may be used to cause processing unit 1602 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above with reference to any one or all of steps of the disclosure can be installed in and sold with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code or instructions to perform functions (e.g., by operating on input data and/or generating an output). Method steps can also be performed by, and apparatus for performing the methods can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors 602, such that the instructions, upon execution by one or more processors 602 cause the one or more processors 602 to perform any one or more of the methodologies described herein. Accordingly, a "machine-readable medium" refers to a single storage apparatus or device, as well as "cloud-based" storage systems that include multiple storage apparatus or devices.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope disclosed herein.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A graph processing system for concurrent property graph queries of a property graph where the property graph is implemented in a distributed network of nodes, comprising:

at least one processor; and a machine-readable medium comprising instructions thereon that, when executed by the at least one processor, causes the at least one processor to perform operations including:

determining on a node of a plurality of nodes within the distributed network of nodes a subgraph shard of a plurality of subgraph shards of the property graph, the node storing data for the subgraph shard that contains a range of local vertices that are a subset of all vertices of the property graph, the subgraph shard having boundary vertices that have edges that connect the subgraph shard to boundary vertices of another subgraph shard;

converting the subgraph shard into a set of edge-sets containing vertices within a certain range by vertex identifier;

receiving concurrent queries of the property graph from at least one user;

scheduling a query of the subgraph shard of the plurality of subgraph shards in accordance with an initial vertex for each concurrent user query; and traversing the property graph during execution of the concurrent queries by traversing edge-sets within the subgraph shard, wherein the node sends values of boundary vertices of the subgraph shard to at least one other node having another subgraph shard sharing the boundary vertices using messaging during traversal of the property graph.

2. The graph processing system as in claim 1, wherein each subgraph shard on each node comprises two bit arrays, a first array for marking a list of adjacent vertices to visit in a next iteration of traversal of the subgraph shard and a second array for verifying vertices in the subgraph shard that already have been visited, the first array and second array having a size N by k, where N is a number of vertices in the subgraph shard and k is a number of concurrent user queries.

3. The graph processing system as in claim 2, wherein traversing the property graph further comprises finding unvisited neighbor nodes in the edge-sets and populating the unvisited neighbor nodes into the first array, visiting the unvisited neighbor nodes and checking for unvisited neighbor nodes, and repeating the visiting and checking for different nodes including at least one of the plurality of subgraph shards.

4. The graph processing system as in claim 1, wherein the node provides to the subgraph shard on the node an inbox for receiving messages from a neighbor subgraph shard and an outbox for providing messages to the neighbor subgraph shard when the neighbor subgraph shard is located on another node in the distributed network of nodes.

5. The graph processing system as in claim 4, wherein the machine-readable medium further comprises instructions that, when executed by the at least one processor, causes the at least one processor to traverse the property graph during execution of the concurrent queries by starting from each root and propagating a unique label to each neighbor vertex to mark traversed edges in an edge-set of the subgraph shard and by using the inbox and outbox to buffer the unique labels sent to and received from the neighbor subgraph shard on the another node in the distributed network of nodes.

6. The graph processing system as in claim 1, wherein the machine-readable medium further comprises instructions that, when executed by the at least one processor, causes the at least one processor to optimize respective edge-sets for sparsity and cache locality.

7. The graph processing system as in claim 1, wherein traversing the property graph comprises traversing (1) shared neighbor vertices of adjacent vertices to visit in a next iteration of traversal of the subgraph shard within an edge-set and (2) shared vertices among concurrent queries only one time for the concurrent queries.

8. The graph processing system as in claim 7, wherein traversing the property graph comprises eliminating repeated traversals of the property graph for a set of queries according to the shared neighbor vertices of adjacent vertices and shared vertices among concurrent queries within the edge-set, wherein the edge-set is accessed once and data therefrom is cached for re-use.

9. The graph processing system as in claim 1, wherein the machine-readable medium further comprises instructions that, when executed by the at least one processor, causes the at least one processor to utilize dynamic resource allocation during traversals of the property graph and to store values for a previous and a current level of the property graph.

10. The graph processing system as in claim 1, wherein the machine-readable medium further comprises instructions that, when executed by the at least one processor, causes the at least one processor to assign vertices of the property graph to different subgraph shards based on vertex identifier and to assign all out-going edges of a vertex to a same subgraph shard.

11. A method for concurrently querying a property graph implemented in a distributed network of nodes, comprising:

determining on a node of a plurality of nodes within the distributed network of nodes a subgraph shard of a plurality of subgraph shards of the property graph, the node storing data for the subgraph shard that contains a range of local vertices that are a subset of all vertices of the property graph, the subgraph shard having boundary vertices that have edges that connect the subgraph shard to boundary vertices of another subgraph shard, the subgraph shard comprising a set of edge-sets containing vertices within a certain range by vertex identifier;

receiving concurrent queries of the property graph from at least one user;

scheduling a query of the subgraph shard of the plurality of subgraph shards in accordance with an initial vertex for each concurrent user query;

traversing the property graph during execution of the concurrent queries by traversing edge-sets within the subgraph shard; and the node sending values of boundary vertices of the subgraph shard to at least one other node having another subgraph shard sharing the boundary vertices using messaging during traversal of the property graph.

12. The method of claim 11, wherein traversing the property graph further comprises finding unvisited neighbor nodes in the edge-sets and populating the unvisited neighbor nodes into a first array for marking a list of adjacent vertices to visit in a next iteration of traversal of the subgraph shard, visiting the unvisited neighbor nodes and checking for unvisited neighbor nodes, and repeating the visiting and checking for different nodes including at least one of the plurality of subgraph shards.

13. The method of claim 12, wherein traversing the property graph further comprises keeping a record of vertices in the subgraph shard that already have been visited in a second array, the first array and second array having a size N by k, where N is a number of vertices in the subgraph shard and k is a number of concurrent user queries.

14. The method of claim 11, wherein traversing the property graph further comprises providing messages to an outbox destined for a neighbor node on a neighbor subgraph shard when the neighbor subgraph shard is located on another node in the distributed network of nodes.

15. The method of claim 14, wherein traversing the property graph further comprises starting from each root specified by the query and propagating a unique label to each neighbor vertex to mark traversed edges in an edge-set of the subgraph shard and buffering the unique labels to send to and receive from the neighbor subgraph shard on the another node in the distributed network of nodes.

16. The method of claim 11, further comprising optimizing respective edge-sets for sparsity and cache locality.

17. The method of claim 11, wherein traversing the property graph further comprises traversing (1) shared neighbor vertices of adjacent vertices to visit in a next iteration of traversal of the subgraph shard within an edge-set and (2) shared vertices among concurrent queries only one time for the concurrent queries.

18. The method of claim 17, wherein traversing the property graph further comprises eliminating repeated traversals of the property graph for a set of concurrent queries according to the shared neighbor vertices of adjacent vertices and shared vertices among concurrent queries within the edge-set, accessing the edge-set once, and caching data therefrom for re-use.

19. The method of claim 11, further comprising utilizing dynamic resource allocation during traversals of the property graph to store values for a previous and a current level of the property graph.

20. A non-transitory computer-readable medium storing computer instructions for concurrently querying a property graph implemented in a distributed network of nodes, that when executed by one or more processors, cause the one or more processors to perform operations comprising:
  determining on a node of a plurality of nodes within the distributed network of nodes a subgraph shard of a plurality of subgraph shards of the property graph, the node storing data for the subgraph shard that contains a range of local vertices that are a subset of all vertices of the property graph, the subgraph shard having boundary vertices that have edges that connect the subgraph shard to boundary vertices of another subgraph shard, the subgraph shard comprising a set of edge-sets containing vertices within a certain range by vertex identifier;
  receiving concurrent queries of the property graph from at least one user;
  scheduling a query of the subgraph shard of the plurality of subgraph shards in accordance with an initial vertex for each concurrent user query;
  traversing the property graph during execution of the concurrent queries by traversing edge-sets within the subgraph shard; and
  the node sending values of boundary vertices of the subgraph shard to at least one other node having another subgraph shard sharing the boundary vertices using messaging during traversal of the property graph.

* * * * *